(12) United States Patent
Giblin et al.

(10) Patent No.: US 11,874,010 B2
(45) Date of Patent: Jan. 16, 2024

(54) PARALLEL FLOW AND COUNTERFLOW INSULATED PRECONDITIONED AIR DELIVERY AND RECIRCULATION SYSTEM

(71) Applicant: TWG Supply, LLC, Grapevine, TX (US)

(72) Inventors: Christopher J. Giblin, Irving, TX (US); William Tyler, North Richland Hills, TX (US); Joe D Gracey, Lewisville, TX (US)

(73) Assignee: TWG Supply, LLC, Grapevine, TX (US)

( * ) Notice: Subject to any disclaimer, the term of this patent is extended or adjusted under 35 U.S.C. 154(b) by 86 days.

(21) Appl. No.: 17/162,383

(22) Filed: Jan. 29, 2021

(65) Prior Publication Data

US 2021/0231334 A1 Jul. 29, 2021

Related U.S. Application Data

(63) Continuation of application No. 16/585,229, filed on Sep. 27, 2019, now Pat. No. 10,907,850.

(60) Provisional application No. 62/738,142, filed on Sep. 28, 2018.

(51) Int. Cl.
| | |
|---|---|
| *F24F 11/48* | (2018.01) |
| *B64F 1/36* | (2017.01) |
| *B60H 1/00* | (2006.01) |
| *F24F 13/06* | (2006.01) |
| *F24F 13/02* | (2006.01) |

(52) U.S. Cl.
CPC .......... *F24F 11/48* (2018.01); *B60H 1/00564* (2013.01); *B64F 1/364* (2013.01); *F24F 13/0272* (2013.01); *F24F 13/06* (2013.01); *F24F 2221/125* (2013.01)

(58) Field of Classification Search
CPC ...... F24F 11/48; F24F 13/06; F24F 2221/125; F24F 13/0272; B64F 1/364; B60H 1/00564
See application file for complete search history.

(56) References Cited

U.S. PATENT DOCUMENTS

| | | | | |
|---|---|---|---|---|
| 7,509,979 | B2 * | 3/2009 | Henriksson | F16L 55/045 138/42 |
| 2013/0061975 | A1 * | 3/2013 | Leadingham | B64F 1/364 138/149 |
| 2013/0277959 | A1 * | 10/2013 | Barthel | F16L 53/32 285/41 |

(Continued)

*Primary Examiner* — Henry T Crenshaw
(74) *Attorney, Agent, or Firm* — Timothy G. Ackermann

(57) ABSTRACT

A self-insulating air delivery and recirculation system maintains a desired air temperature of the conditioned air supplied thereinto for delivery to an aircraft. The system uses insulating airflow layers; a parallel layer and a counterflow layer. A starting section connects to a PCA unit and delivers conditioned air therefrom to an interior supply hose. The starting section supplies conditioned insulating air to an interior insulating hose that is annularly outward of the supply hose and in which air flows parallel to airflow in the supply hose. A reversing connector indirectly connects the supply hose to the aircraft and reverses the flow of air from the interior insulating hose to flow back toward the PCA unit in an exterior counterflow hose that is annularly outward of the interior insulating hose and connects at its far end to provide intake airflow to the PCA unit.

16 Claims, 23 Drawing Sheets

(56) References Cited

U.S. PATENT DOCUMENTS

2014/0261701 A1\* 9/2014 Deutsch .............. F24F 13/0272 138/119
2016/0176263 A1\* 6/2016 Hutchison ............ B60H 1/3232 62/89

\* cited by examiner

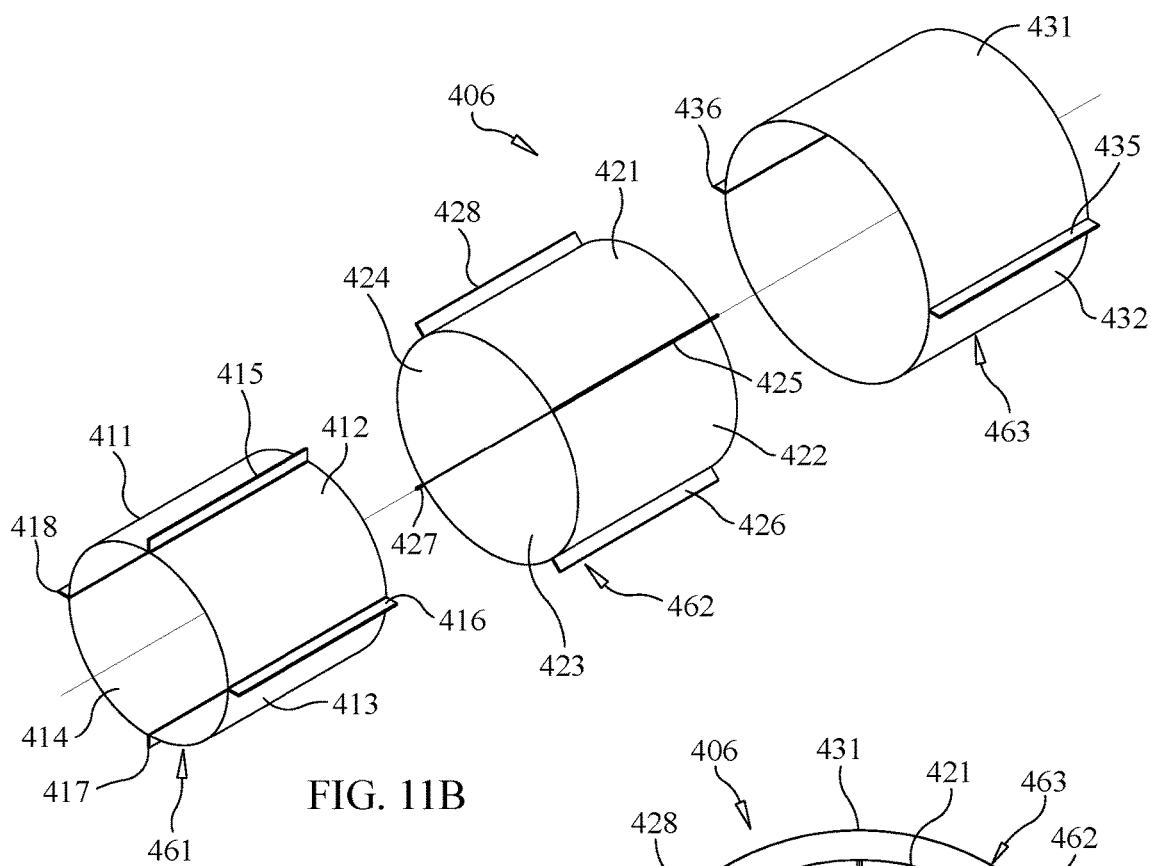
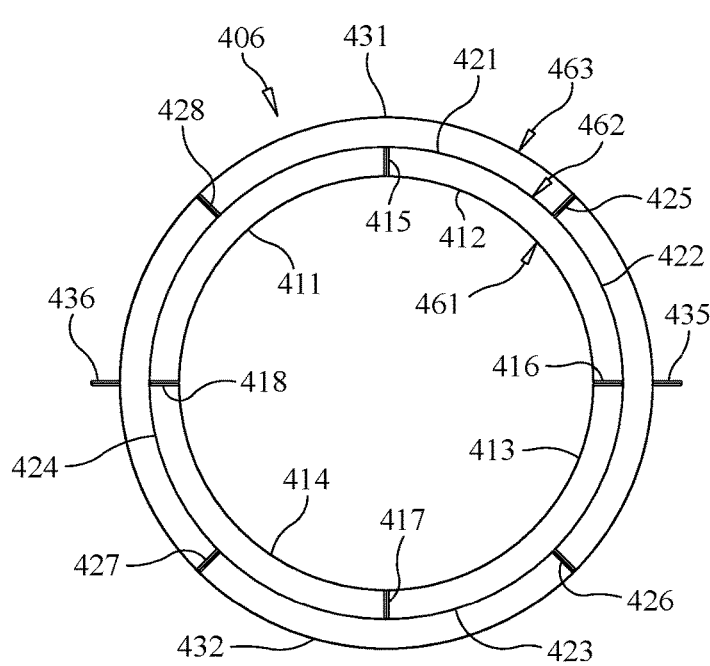
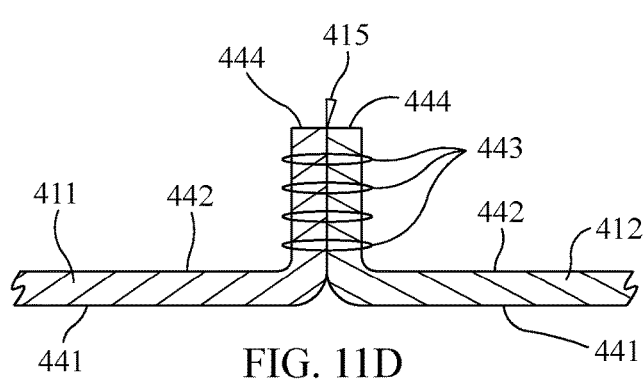
FIG. 11B
FIG. 11C
FIG. 11D

PARALLEL FLOW AND COUNTERFLOW INSULATED PRECONDITIONED AIR DELIVERY AND RECIRCULATION SYSTEM

BACKGROUND OF THE INVENTION

Aircraft typically require supply of air that has been conditioned to desired temperature and/or humidity. On the ground, it may be necessary or desirable to supply that air from outside the aircraft, permitting use of more efficient ground-based systems or the shutting down of aircraft-based systems.

A ground-based conditioned-air supply system may or may not be mobile and must be connected to supply that conditioned air to an input system on the aircraft. The connection, distance, path, and direction may vary depending upon the placement of the aircraft on the apron, and the presence of intervening objects on the apron. A common means to connect the ground-based supply system to the aircraft is some form of hose between the input connector and the supply system.

A problem to overcome is that the air inside the hose is subjected to thermal loading that can affect the in-hose temperature of the air in undesirable ways. For instance, on a hot summer day, an aircraft will be supplied with chilled air to maintain a comfortable internal temperature. The ground-based supply system will create chilled air, and deliver it to a hose, which will deliver it to the aircraft. But the hose will receive heat via conduction and/or radiation from the apron (typically concrete) which is exposed to the sun. And the hose will receive heat via convection from the warmer ambient air and via radiation from the sun. As the hose warms (or remains warm) the cooler chilled air convects away heat inside the hose as it travels to the aircraft, and thus arrives at a warmer temperature than desired. The result is that ground-based supply system must supply chilled air at a substantially colder temperature than the ultimately desired temperature. Conversely, on a cold winter day, an aircraft will be supplied with warmed air to maintain a comfortable internal temperature. The ground-based supply system will create warmed air, and deliver it to a hose, which will deliver it to the aircraft. But the hose will lose heat via conduction and/or radiation to the apron (typically concrete) which is exposed to the cold ambient air/snow/ice, etc. As the hose cools (or remains cold) the warmer air loses heat by convection inside the hose as it travels to the aircraft, and thus arrives at a cooler temperature than desired. The result is that ground-based supply system must supply warmed air at a substantially warmer temperature than the ultimately desired temperature. Both circumstances result in having to provide larger supply units and use excess energy for warming/cooling than is preferred.

In addition, self-insulated conditioned air could also be supplied by the system in other environments requiring remote cooling options but experiencing demanding ambient conditions, such as in mines, mineshafts, and temporary workplaces lacking other ventilation.

SUMMARY OF THE INVENTION

A self-insulating air delivery system helps maintain the desired air temperature of the conditioned air supplied thereinto for delivery to an aircraft. The air delivery system uses a three-layer dual counterflow air delivery/insulation arrangement to maintain the desired air temperature, including two layers of insulating airflow. The system includes a including a starting section attached to a Pre-Conditioned Air (PCA) unit, a reversing connector, and a three-layered concentric hose assembly attaching the starting section and the reversing connector. The PCA unit supplies conditioned air into the starting section. The starting section supplies conditioned air to an interior supply hose. The starting section also either creates bleed conditioned air or accepts conditioned insulating air and supplies it to a first interior insulating hose that is concentrically outward of the supply hose. Thus, there is a first annular insulating air layer between the supply hose and the interior insulating hose, with a parallel insulating airflow. The system further includes a reversing connector for indirectly connecting the supply hose to the aircraft, and accepting and reversing the flow of air in the first annular insulating air layer to flow back toward the PCA unit in a second, counterflow, annular insulating air layer between the first insulating hose and a second, exterior, insulating hose. The airflow in the second annular insulating air layer travels in the opposite direction of the supply air flow and of the first annular insulating layer.

The diverter starter section is comprised of three concentric tubes with diameters the smallest of which corresponds to a standard PCA hose diameter and two increasingly larger sections encircling it. Conditioned air is introduced to the starter section for delivery via the delivery path inside the innermost tube to the aircraft. Insulating flow is initiated by the starter section introducing air to the middle layer between the innermost tube and the middle tube. That may be accomplished by diverting part of the air delivered to the starter section, e.g. via a common plenum, from the delivery path to the middle, insulating, layer. It may also be accomplished by providing a second air input directly into the middle layer, such as from an auxiliary cooling source, or as a take-off from the PCA unit. A return, counterflow, path is provided in the outer layer between the middle tube and the outer tube, which exhausts to the atmosphere via a discharge system. The starter section may be extruded, case, milled, or formed using other known techniques.

The hose assembly includes three hoses arranged concentrically and corresponding to the sizes of the three tubes in the diverter starter section. The hose delivery assembly has three layers: a continuous inner liner disposed within two concentric external conduits. The hoses include standard PCA connection mechanisms at their ends, such as zippers, hook-and-loop fabric connectors, clamps, or other connections suitable for connecting textile elements. The hose assembly may be integral, or the hoses connected to each other for stability or ease of use, such as by flexible connectors at their ends, or within the layers between the hoses. The interior hoses may also include spacing elements on their exteriors to prevent collapse of the insulating middle layer and outer counterflow layer. The hoses are fluidly coupled to the starter section as to ensure air can both flow through the innermost hose delivery path as well in the insulating middle layer, and also via the outer counterflow layer. The hoses are preferably not fluidically coupled to one another (i.e. the three air flow paths remain separate therein). The counterflow layer provides a path for flow running counter to the delivery path in the innermost hose, back to the starter section for safe discharge. As an added benefit the outer hoses become a sacrificial outer jacket to the main PCA hose that delivers air to the aircraft The reversing connector includes three concentric tubes with diameters corresponding to the three hoses. The reversing connector accepts air from the inside of the innermost hose into the smallest tube via the delivery path and delivers that air into an 8" trunk section and then into the aircraft. The air that was diverted at the starter section into the middle layer and traveled through the hose assembly in that middle layer, is received and then reversed in a reverser as a counterflow. That counterflow then travels back between the middle tube and the outer tube and is delivered to the counterflow path in between the middle and outer hoses. Once the air that was diverted has made its flow all the back to the diverter starter section it is safely discharged vertically away from people and equipment.

The purpose of diverting air to a first and then a second outer section of the hose system is to insulate the preconditioned air that ultimately makes its way from the PCA unit to the aircraft. The air that will most be affected and heated/cooled by external factors, such as the sun or the ground, is not directed into the aircraft, but rather dissipated in a safe manner. This will result in air making its way into the aircraft at temperatures closer to desired levels, and closer to the temperature being supplied by the PCA.

Tube sizing, in certain embodiments may include the following: approximately 14/15/16 inches; approximately 14/16/18 inches; approximately 12/13/14 inches; approximately 12/14/16 inches. Tube sizing impacts the ratios of insulating air (both parallel & counterflow) to insulated air (for delivery to the aircraft), and parallel insulating air and counterflow insulating air to of insulated air. Although both insulating airflows will be affected by other factors (such as the amount of bleed air supplied), the layer thickness of the insulating airflow affects the thermal resistance and insulating effects. For tubes of x/y/z diameter these ratios would be calculated as: insulating to insulated air ratio of $R_{ia}=(z^2-x^2)/x^2$; counterflow to insulated air ratio of $R_{ca}=(z^2-y^2)/x^2$; parallel to insulated air ratio of $R_{pa}=(y^2-x^2)/x^2$; and counterflow to parallel air ratio of $R_{cp}=(z^2-y^2)/(y^2-x^2)$.

This application expressly incorporates by reference the entire disclosure of U.S. Ser. No. 62/738,142 and 62/738,119.

BRIEF DESCRIPTION OF THE DRAWINGS

FIGS. 11A, 11B, & 11C are, respectively, perspective, perspective exploded, and side, views of an embodiment of a section of a set of hoses for the delivery system.

FIG. 11D is a partial detail view of an embodiment of a tab on a set of hoses for the delivery system.

DETAILED DESCRIPTION

Figure 1A:
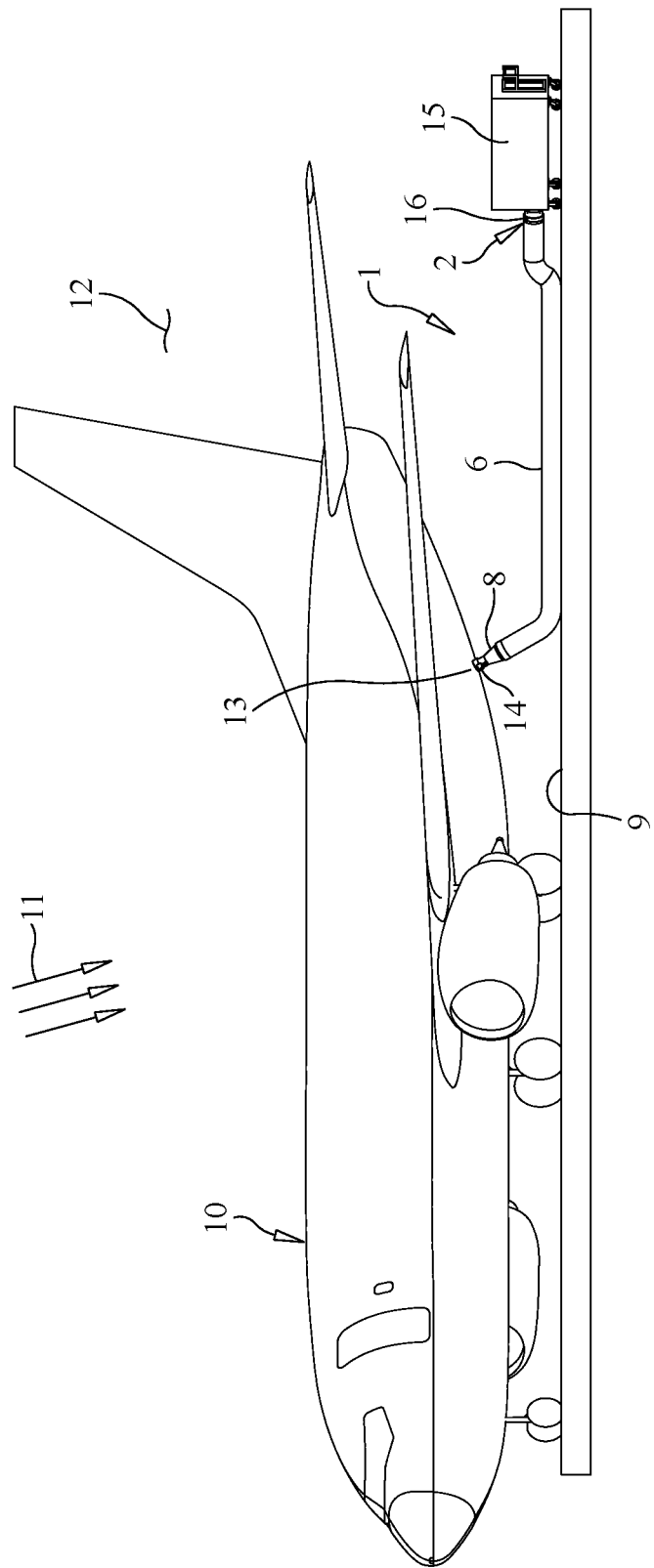
FIG. 1A is a side view of an embodiment of the delivery system connecting an aircraft and a conditioned air source.

FIG. 1A shows an embodiment of the counterflow air delivery system in operation. Aircraft 10 sits on tarmac 9 and includes aircraft receiver 13. Mobile conditioned air supply unit 15 also sits on tarmac 9 and includes output starter hose 16 for delivering conditioned air for aircraft 10. Air delivery system 1, together with connector assembly 14, create a counterflow insulated air delivery path between aircraft 10 and unit 15. Air delivery system 1 includes a starter section or starter body, i.e. the charge end assembly 2, counterflow hose assembly 6, and a reverser body or reversing connector, i.e. the return hose assembly 8. Charge end assembly 2 connects to output starter hose 16, is connected to hose assembly 6, which is connected to return hose assembly 8. Connector assembly 14 connects return hose assembly 8 to aircraft receiver 13. All of these components and assemblies are exposed to thermal loading arising from exposure to ambient air 12, solar and other radiation 11, and tarmac 9.

Figure 2:
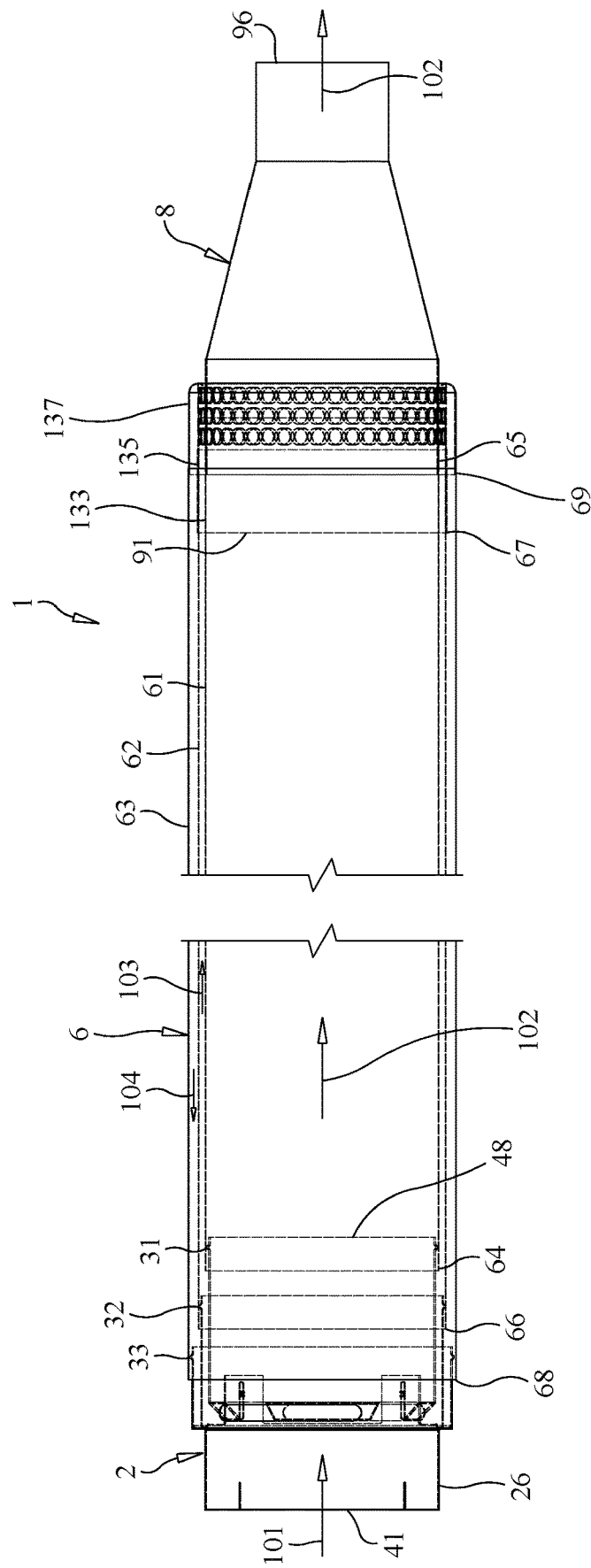
FIG. 2 is a side view of an embodiment of the delivery system.
Figure 3A:
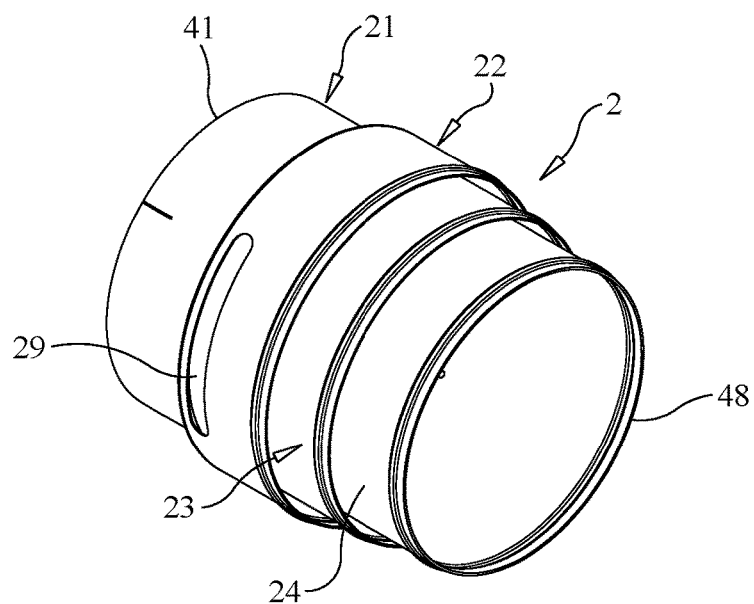
FIGS. 3A, 3B, & 3C are, respectively, perspective, perspective exploded, and side exploded, views of an embodiment of a charge end assembly of a delivery system.
Figure 3B:
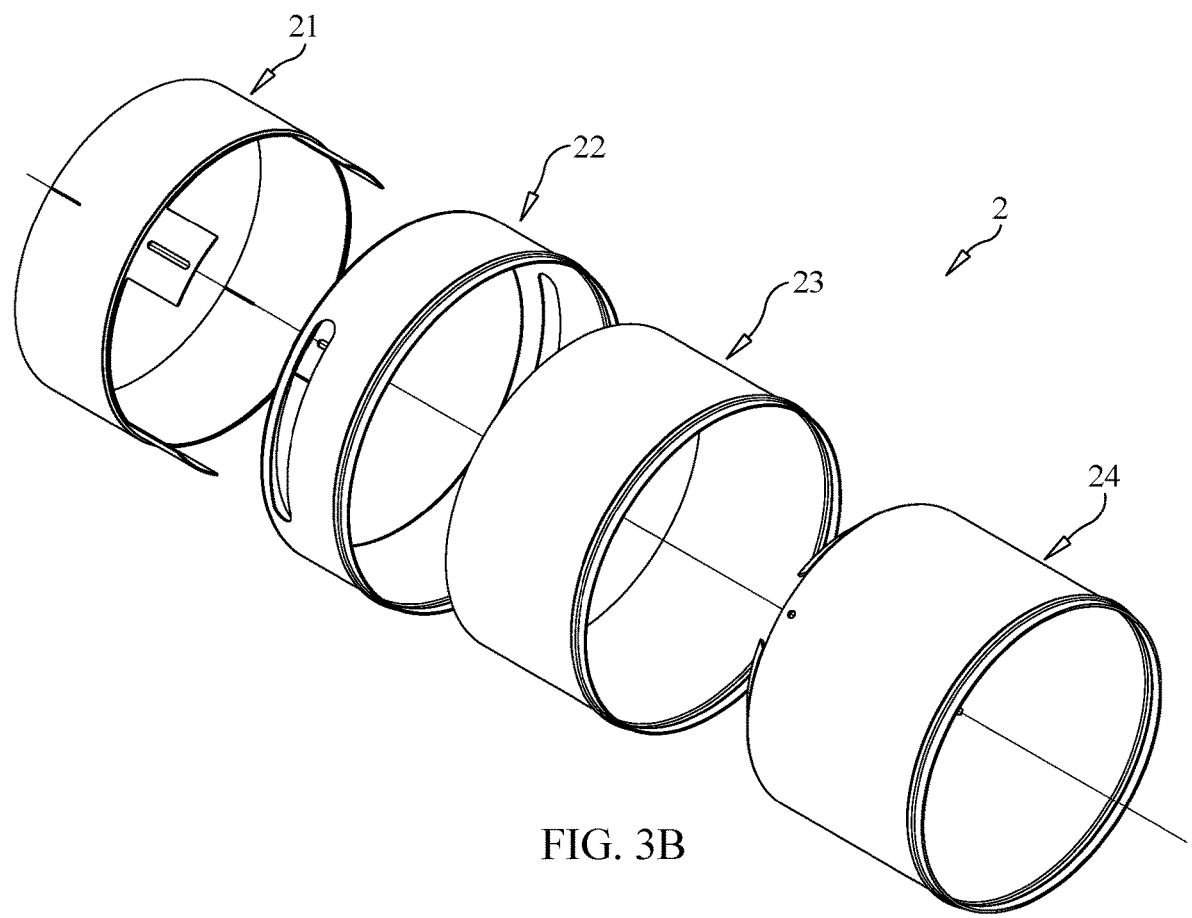
Figure 3C:
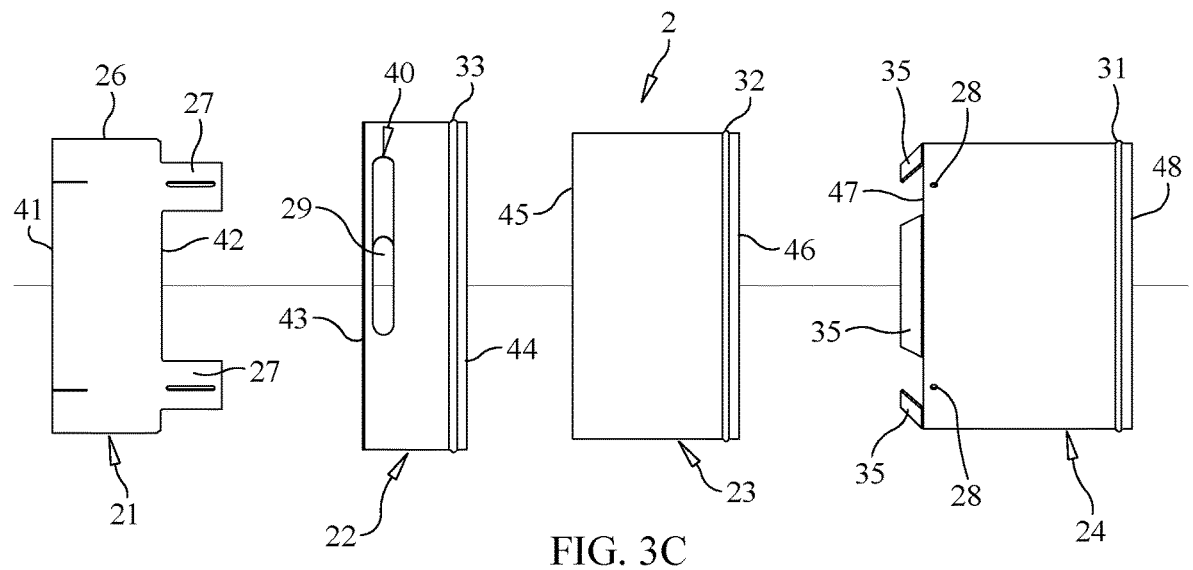
Figure 3D:
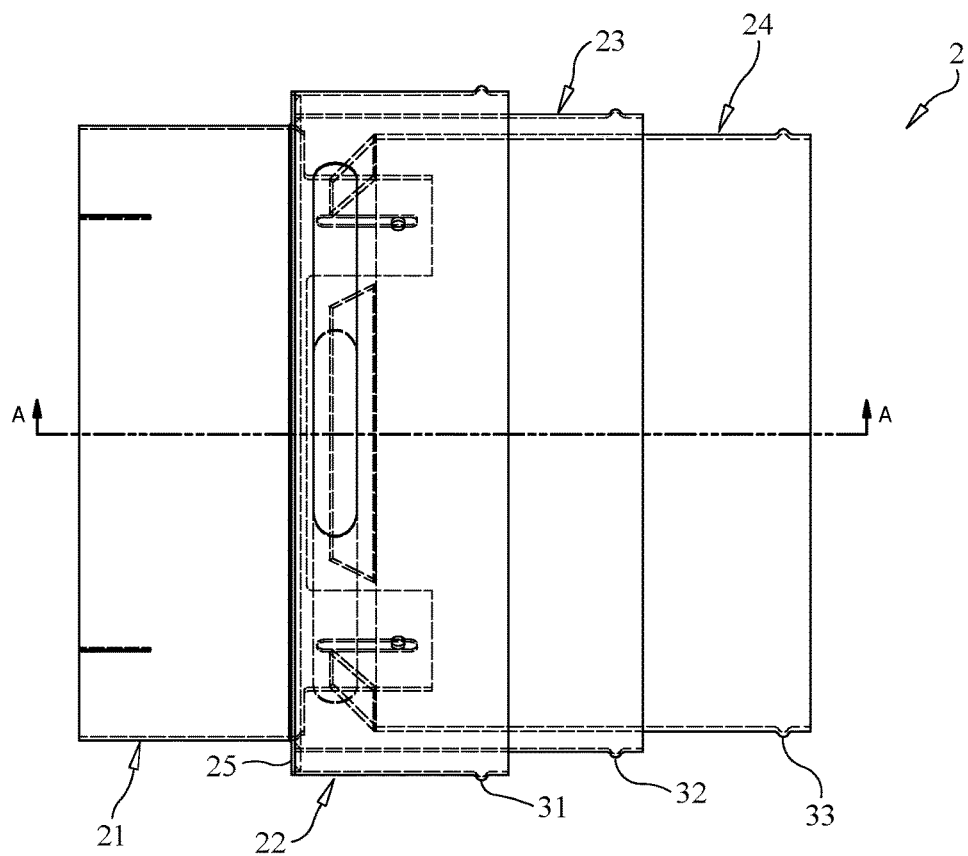
FIG. 3D is a side view of an embodiment of a charge end assembly of FIGS. 3A-3C.
Figure 3E:
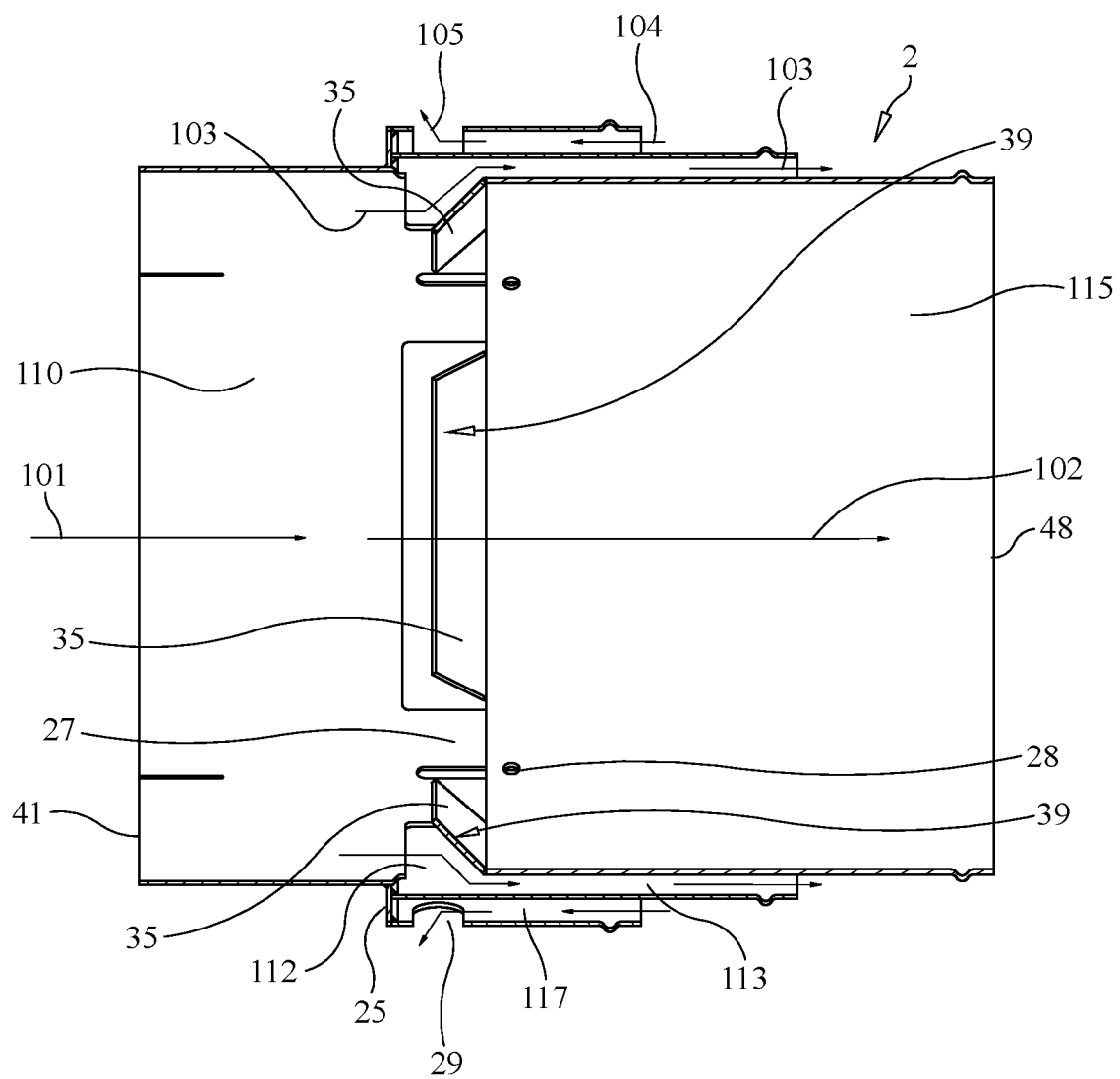
FIG. 3E is a cross-section view of the charge end assembly of FIG. 3D along section lines A-A.
Figure 3F:
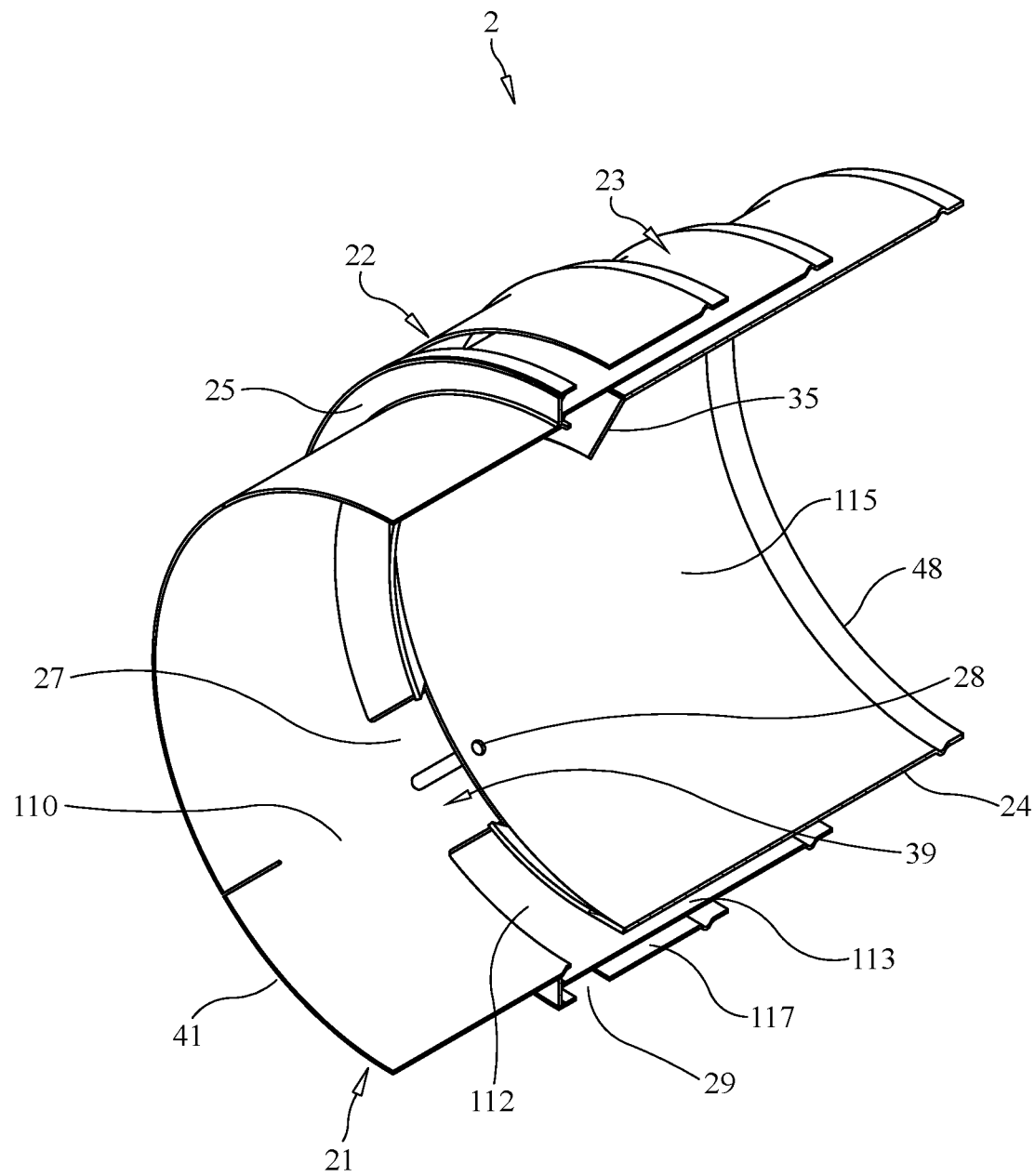
FIG. 3F is a perspective view of the cross-section of FIG. 3E.

Turning to FIG. 2 (and with reference to FIGS. 3C and 5C), an embodiment of air delivery system 1 comprises charge end assembly 2, counterflow hose assembly 6, and return hose assembly 8. Charge end assembly 2 (depicted more fully in FIGS. 3A-3I) includes starter connection 26 with inlet end 41 and discharge end 48. Tubular connectors 22, 23, and 24 include, respectively from the outermost inward, ribs 33, 32, and 31, adjacent to discharge ends 44, 46, 48 of those connectors. Return hose assembly 8 (depicted more fully in FIGS. 5A-5F) includes inlet end 91, and discharge end section 99 with discharge end 96. Tubular connectors 82, 81, and 83 include, respectively from the outermost inward, hose retaining assemblies 137, 135, and 133, adjacent to inlets ends 93, 91, 95 of those connectors. Counterflow hose assembly 6 includes, from the outermost inward, exterior hose 63, counterflow hose 62, and supply hose 61. As reflected more fully in FIGS. 4A-4C, inlet end 64 of supply hose 61 is connected about rib 31 of supply connector 24 using band clamp 36, inlet end 66 of counterflow hose 62 is connected about rib 32 of counterflow inlet connector 23 using band clamp 37, and inlet end 68 of exterior hose 63 is connected about rib 33 of counterflow discharge connector 22 using band clamp 38.

Figure 6:
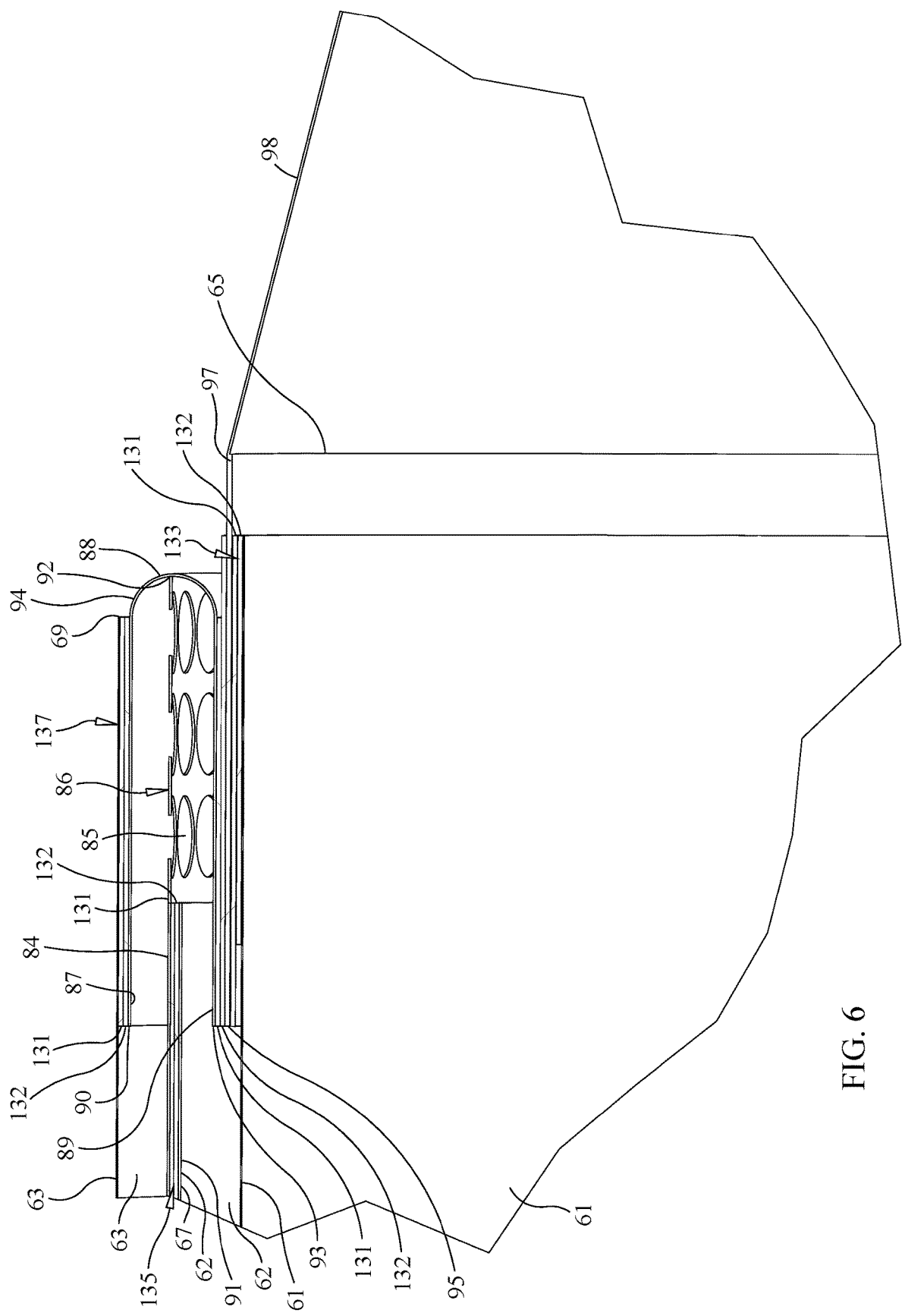
FIG. 6 is a cutaway cross-section view depicting the attachment of an embodiment of a counterflow hose assembly to an embodiment of a return hose assembly of a delivery system.

As reflected more fully in FIG. 6, outlet end 65 of supply hose 61 is connected to intake section 97 of supply discharge section 83 near intake end 95 using hose retaining assembly 133, outlet end 67 of counterflow hose 62 is connected to divider 84 of flow divider section 81 near end 91 using hose retaining assembly 135, and outlet end 69 of exterior hose 63 is connected about outlet section 87 of reverser section 82 near end 93 using hose retaining assembly 137. And interior wall 89 is connected about intake section 97. Hose retaining assemblies 133, 135, 137, may include different attachment structures for tubular connections, including hook-and-loop connectors 131, 132 or zippers (not shown).

Figure 8A:
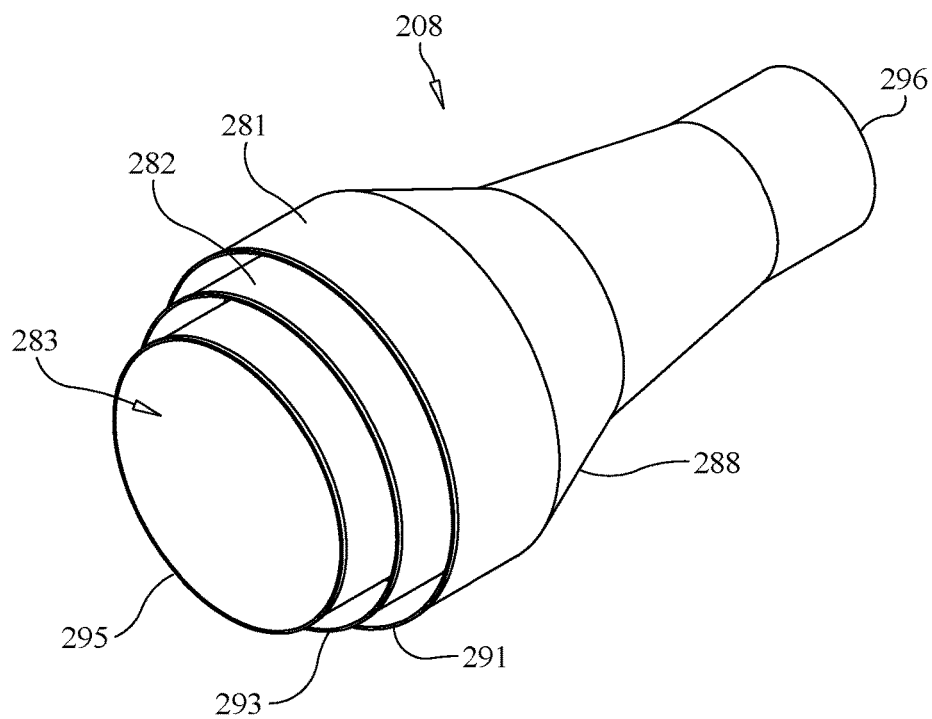
FIGS. 8A, 8B, & 8C are, respectively, perspective, perspective exploded, and side exploded, views of another embodiment of a return hose assembly of a delivery system.
Figure 8B:
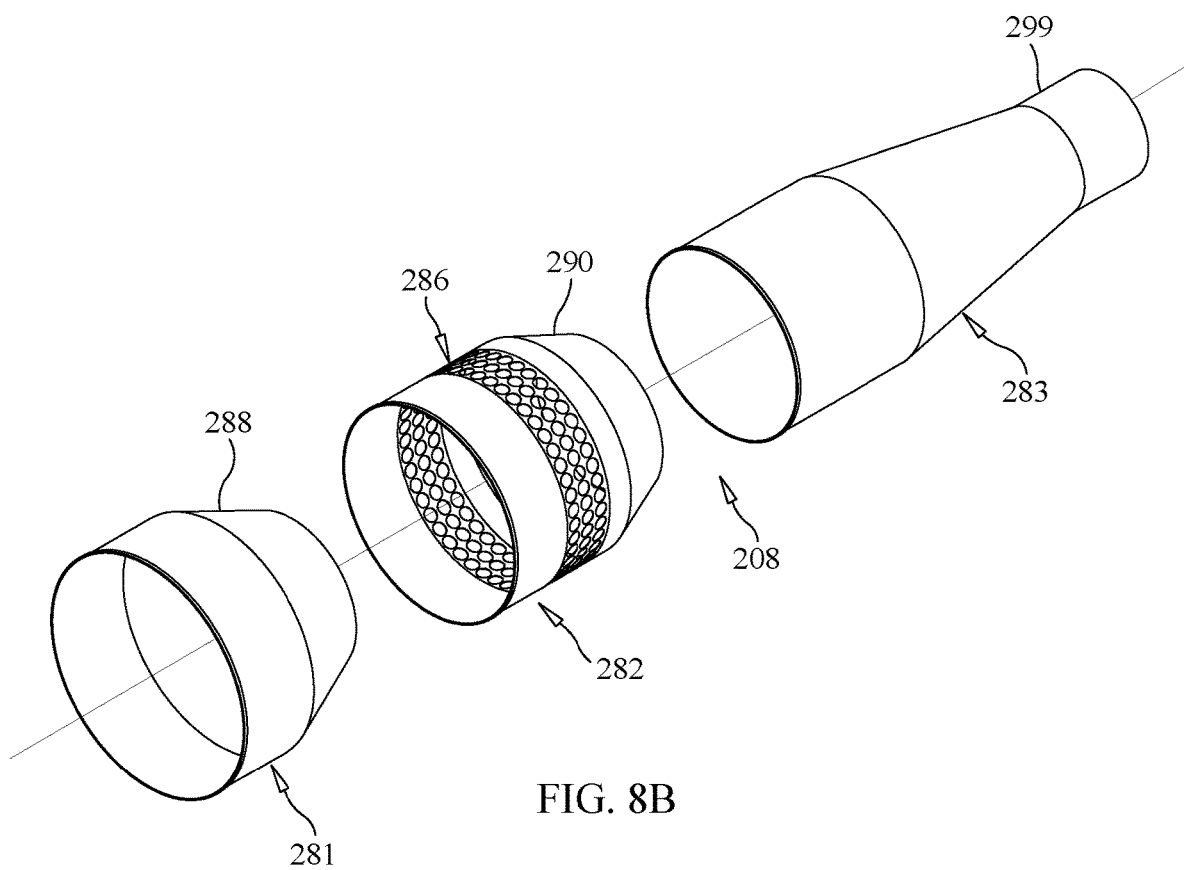
Figure 8C:
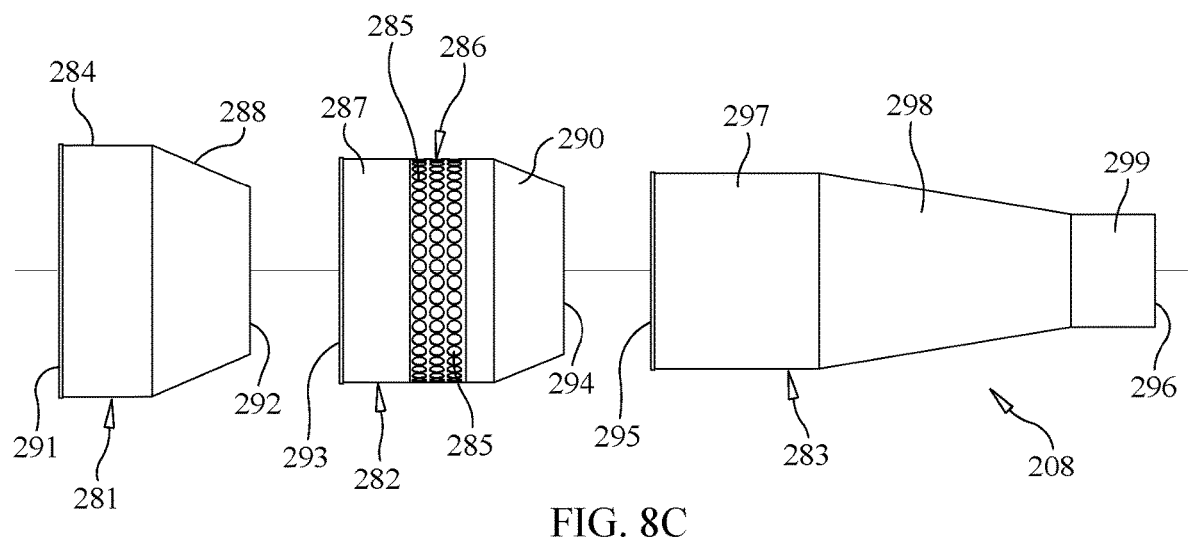
Figure 8D:
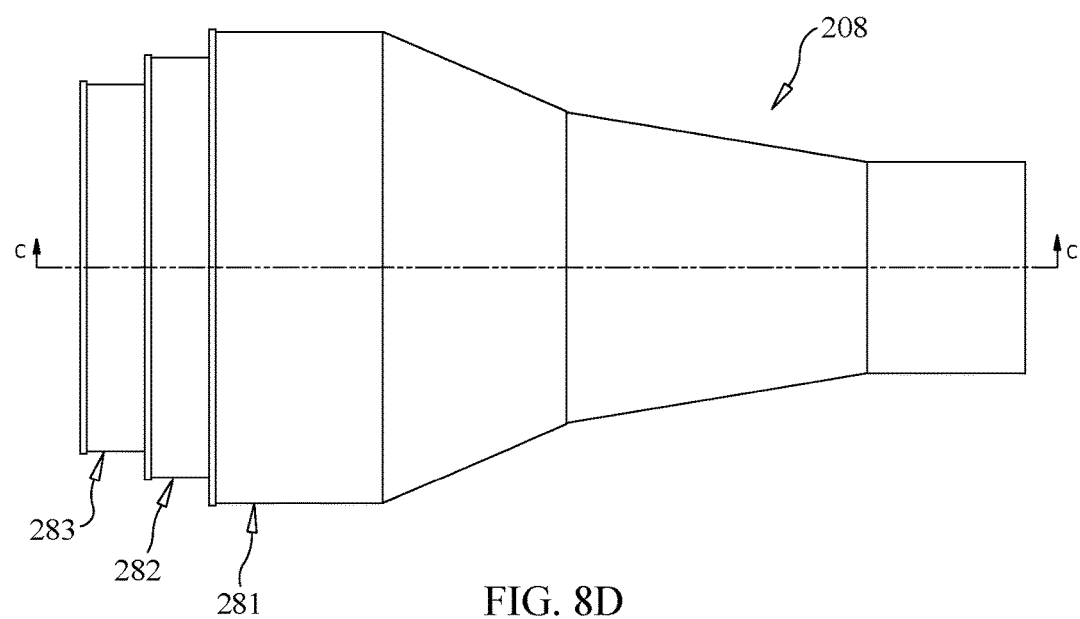
FIG. 8D is a side view of an embodiment of a return hose assembly of FIGS. 8A-8C.
Figure 8E:
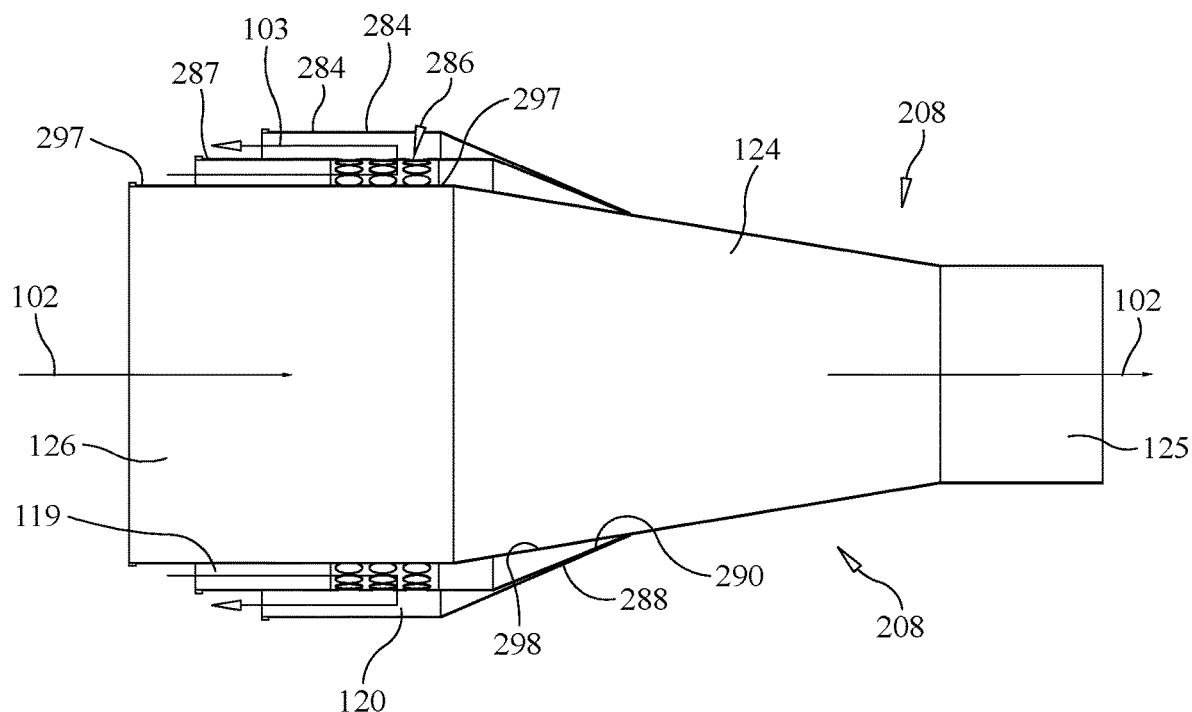
FIG. 8E is a cross-section view of the return hose assembly of FIG. 8D along section lines C-C.
Figure 8F:
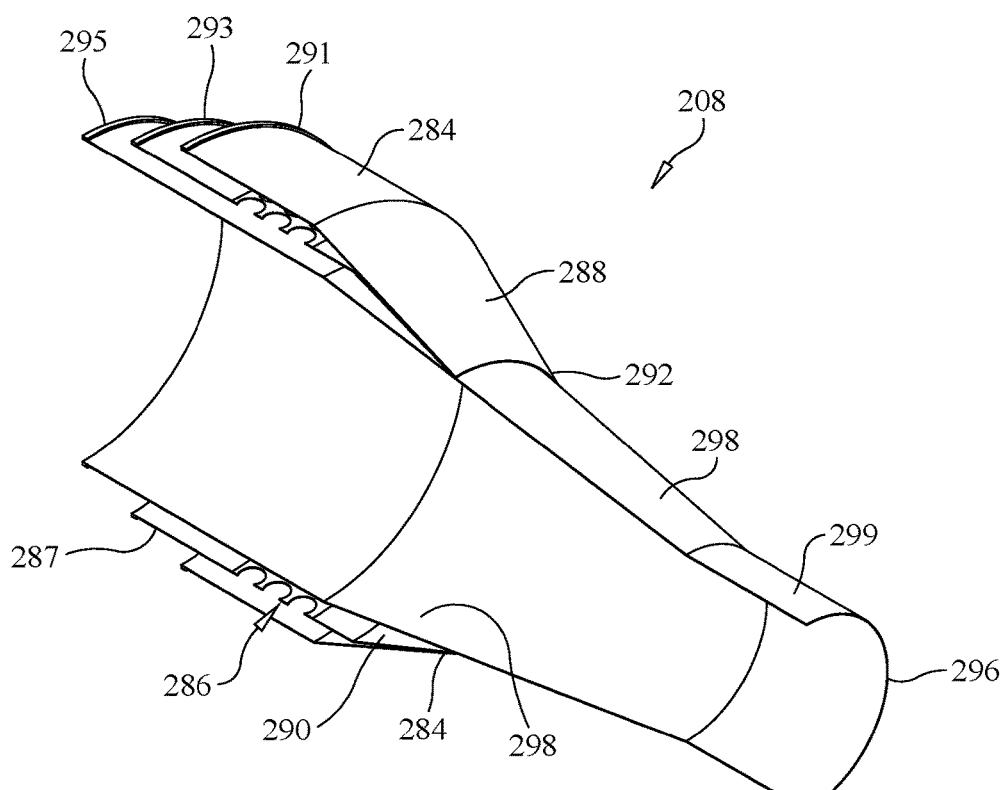
FIG. 8F is a perspective view of the cross-section of FIG. 8E.
Figure 9:
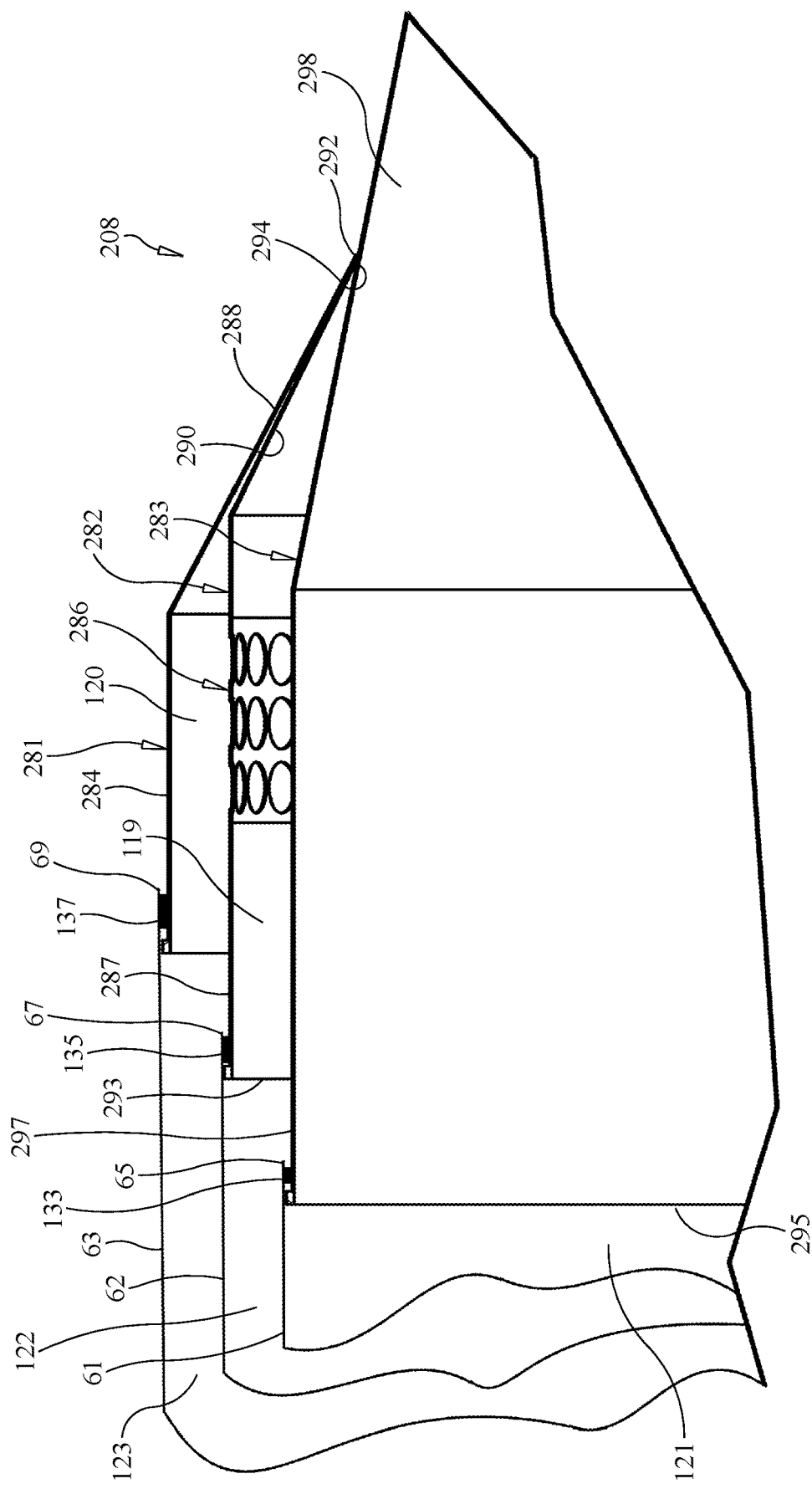
FIG. 9 is a cutaway cross-section view depicting the attachment of an embodiment of a counterflow hose assembly to an embodiment of a return hose assembly of a delivery system.

With reference to FIG. 8C and elements depicted in FIGS. 2 and 9, an embodiment of air delivery system 1 comprises charge end assembly 2, counterflow hose assembly 6, and a reverser body or reversing connector, i.e. the return hose assembly 208. Charge end assembly 2 (depicted more fully in FIGS. 3A-3I) includes starter connection 26 with inlet end 41 and discharge end 48. Tubular connectors 22, 23, and 24 include, respectively from the outermost inward, ribs 33, 32, and 31, adjacent to discharge ends 44, 46, 48 of those connectors. Return hose assembly 208 (depicted more fully in FIGS. 8A-8F) includes inlet end 291, and discharge end section 299 with discharge end 296. Tubular connectors 281, 282, and 283 include, respectively from the outermost inward, hose retaining assemblies 137, 135, and 133 (shown in FIG. 9), adjacent to inlets ends 291, 293, 295 of those connectors. Counterflow hose assembly 6 includes, from the outermost inward, exterior hose 63, counterflow hose 62, and supply hose 61. As reflected more fully in FIGS. 4A-4C, inlet end 64 of supply hose 61 is connected about rib 31 of supply connector 24 using band clamp 36, inlet end 66 of counterflow hose 62 is connected about rib 32 of counterflow inlet connector 23 using band clamp 37, and inlet end 68 of exterior hose 63 is connected about rib 33 of counterflow discharge connector 22 using band clamp 38.

As reflected more fully in FIG. 9, outlet end 65 of supply hose 61 is connected about intake section 297 of supply discharge section 283 near intake end 295 using hose retaining assembly 133, outlet end 67 of counterflow hose 62 is connected about divider 287 of divider section 282 near end 293 using hose retaining assembly 135, and outlet end 69 of exterior hose 63 is connected about exterior wall 284 of reverser section 281 near end 291 using hose retaining assembly 137.

Turning to FIGS. 3A-3F, an embodiment of charge end assembly 2 includes starter connector 21, counterflow discharge connector 22, counterflow inlet connector 23, and supply connector 24 arranged generally from intake to discharge, and in a concentric fashion. Each of connectors 21-24 is made of a resilient material suitable for high airflows and vibration, varying temperatures, and physical stress due to hose-induced tension and torsion. Such resilient materials include steels, such as sheetmetals (e.g. 16-22 gauge), aluminums, and other materials such as fiberglass, or 3D-printed or molded materials.

Starter connector 21 includes inlet end 41, discharge end 42, starter connection 26 at inlet end 41, and slotted flange connectors 27 on discharge end 42. Starter connector 21 forms inlet plenum 110. In practice, starter connection 26 is a standard size, e.g. 14" or 12" to cooperate with a standard sized starter hose from a conditioned air supply.

Counterflow discharge connector 22 includes inlet end 43, discharge end 44, counterflow discharge slots 29 near inlet end 43, partial closure 25 at inlet end 43, and rib 33 near discharge end 44. Counterflow discharge connector 22 has a larger i.d. than the o.d. of starter connector 21 with a reduced-size opening at one end formed by partial closure 25.

Counterflow inlet connector 23 includes inlet end 45, discharge end 46, and rib 32 near discharge end 46. Counterflow inlet connector 23 is slightly larger than starter connection, but smaller than counterflow discharge connector 22 to form annular channel 117 therebetween. Supply connector 24 includes inlet end 47 and discharge end 48, flow diverters 35 at inlet end 47, joint 28 between supply connector 24 and slotted flange connectors 27 of starter connector 21, and rib 31 near discharge end 48.

Supply connector 24 forms supply plenum 115 interior thereto, and has an o.d. smaller than the i.d. of counterflow inlet connector 23 so as to form annular channel 113 therebetween. Flow diverters 35 are angled radially inward at about a 45-degree angle into inlet plenum 110 forming insulation intakes 112 between diverters 35 and the interior of counterflow inlet connector 23. Flow diverters 35 extend inward about an inch inward, but other lengths may be desirable depending upon flow conditions. Flow diverters, in an embodiment, extend in about a 60-degree arc about the circumference of connector 24. Downstream of diverters 35 and inlet plenum 110 is supply plenum 115.

Starter connector 21 is connected by slotted flange connectors 27 at joint 28 to supply connector 24. Slotted flange connectors 27, in an embodiment, extend in about a 30-degree arc. As flange connectors 27 alternate with flow diverters 35 and do not extend continuously around the circumferences, airflow can reach insulation intakes 112, forming bleed air structure 39. Slotted flange connectors 27 allow joint 28 to be made at different longitudinal points on connector 27, permitting adjustment of the extent of insulation intakes 112. The roughly ⅓-to-⅔ ratio between the radial extent of flange connectors 27 and flow diverters 35 could vary by design, such as roughly ⅔-to-⅓ or ½-to-½. Joint 28 may be any suitable connector, such as a bolt, spot weld, rivet, etc. Counterflow discharge connector 22 is connected at partial closure 25 to the exterior of starter connector 21, forming an upstream closure of annular channel 117. Discharge slots 29 connect annular channel 117 to the exterior of charge end assembly 2, forming exhaust 40. Counterflow inlet connector 23 is connected at inlet end 45 thereof to partial closure 25, forming the interior of annular channel 117, the exterior of annular channel 113 and insulation intakes 112. Connectors 22, 23, 24 are each shorter than the next forming a staggered set of discharge ends 44, 46, 48 ends for hoses 63, 62, 61. Discharge ends 44, 46, 48 are each small than the previous in diameter to accommodate concentric hoses of decreasing size. Connections between counterflow discharge connector 22 and starter connector, and between counterflow inlet connector 23 and counterflow discharge connector 22 are appropriate to their respective materials, but may include welding, epoxy, and molding.

Figure 3G:
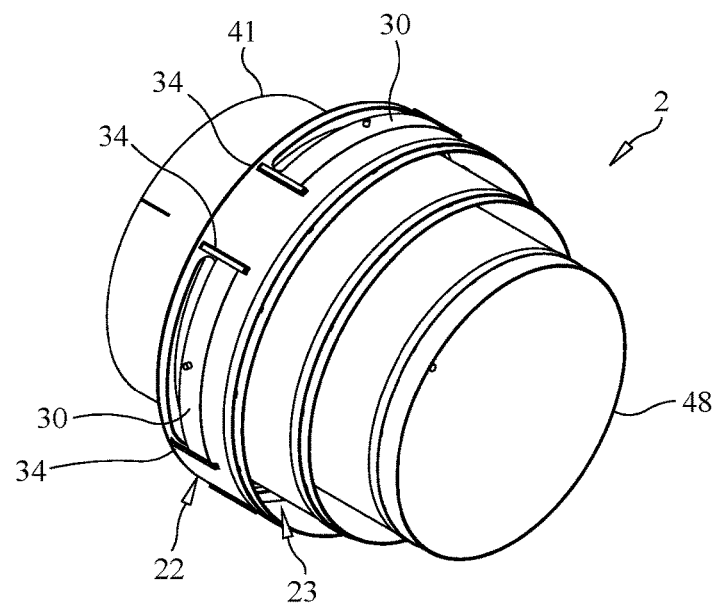
FIGS. 3G, 3H, & 3I are, respectively, perspective, perspective exploded, and side exploded, views of another embodiment of a charge end assembly of a delivery system.
Figure 3H:
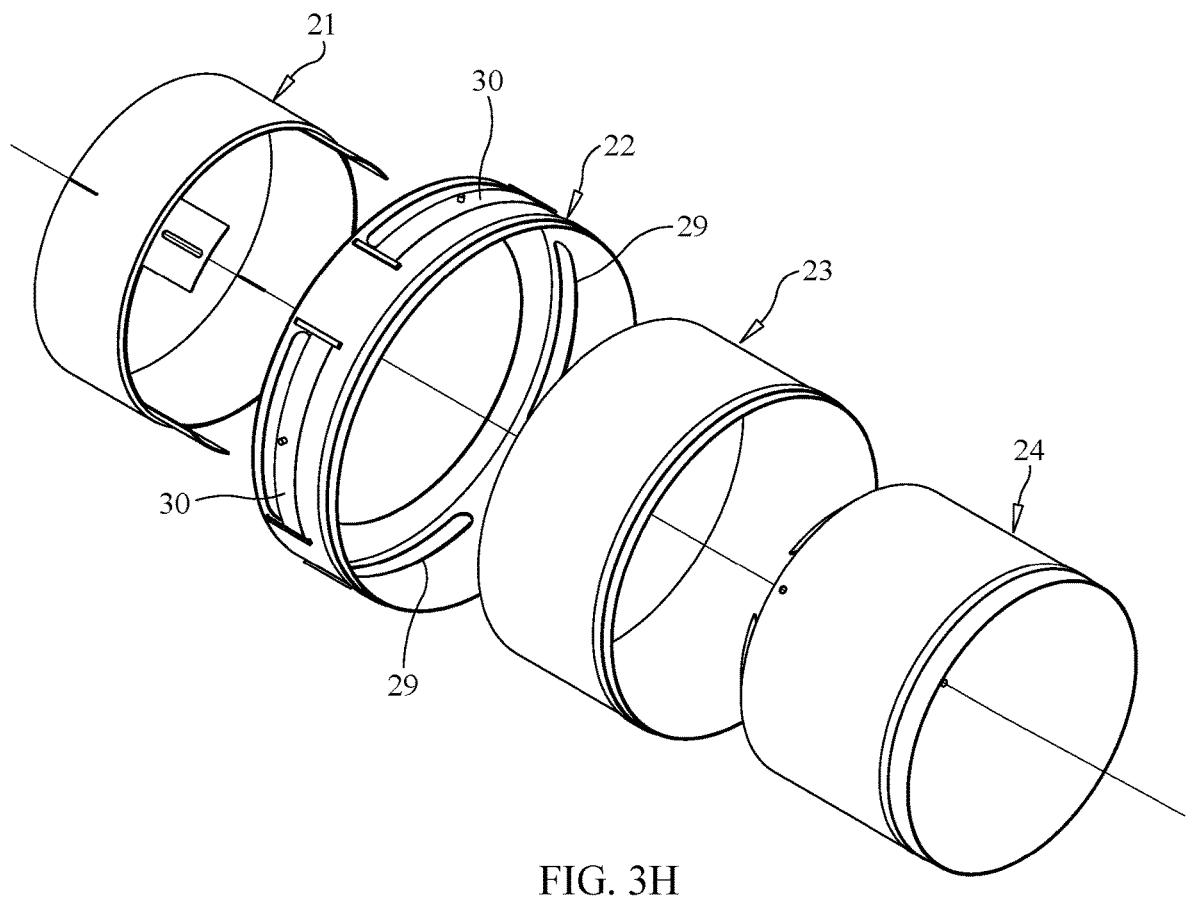
Figure 3I:
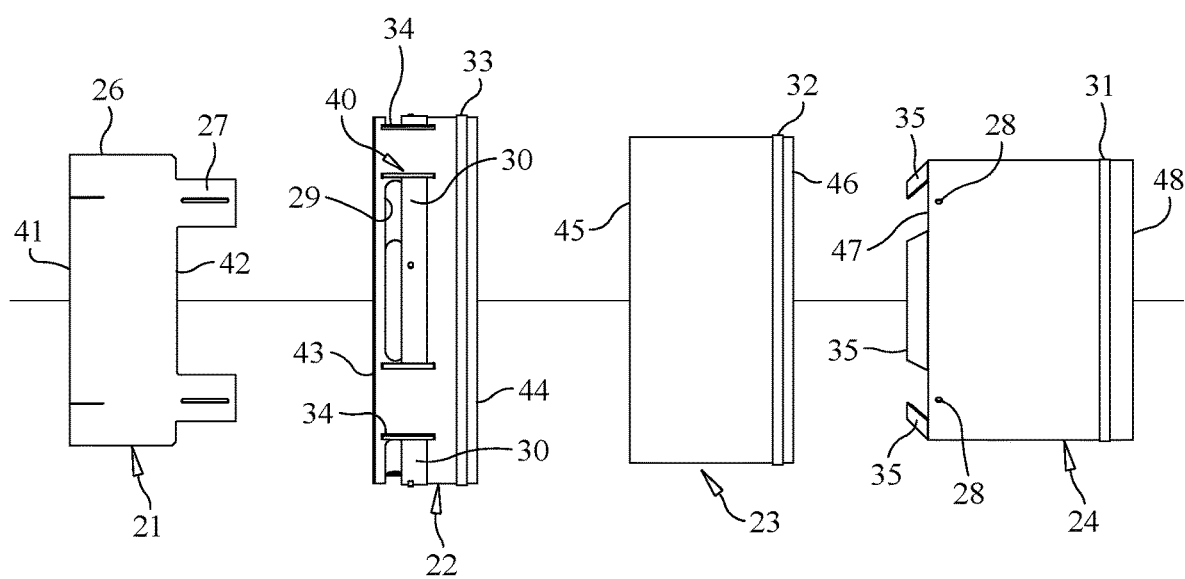

Turning to FIGS. 3G-3I, another embodiment of charge end assembly 2 includes an additional feature of dampers; the remaining feature having same reference numerals conform to the description of FIGS. 3A-3G above. Tracks 34 are attached to the exterior of counterflow discharge connector 22 on either side of each of counterflow discharge slots 29. Sliding dampers 30 are slidably retained on counterflow discharge connector 22 by tracks 34 on each end of dampers 30. Dampers 30 may be fully opened, permitting maximum airflow though one or more of discharge slots 29, or partially closed, reducing airflow therethrough, or some may even be completely closed, limiting airflow.

Figure 4A:
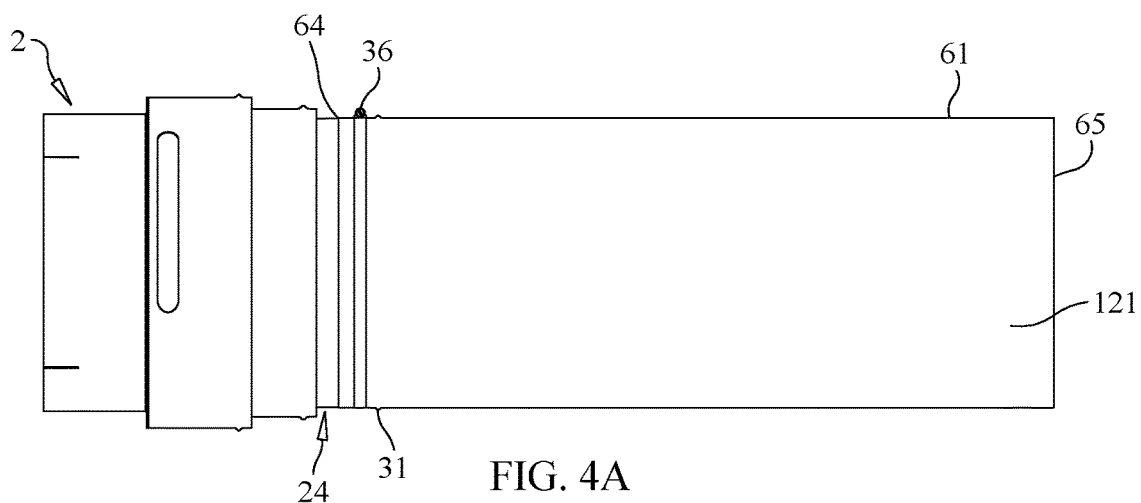
FIGS. 4A-4C are side views depicting the attachment of an embodiment of a counterflow hose assembly to an embodiment of a charge end assembly of a delivery system.
Figure 4B:
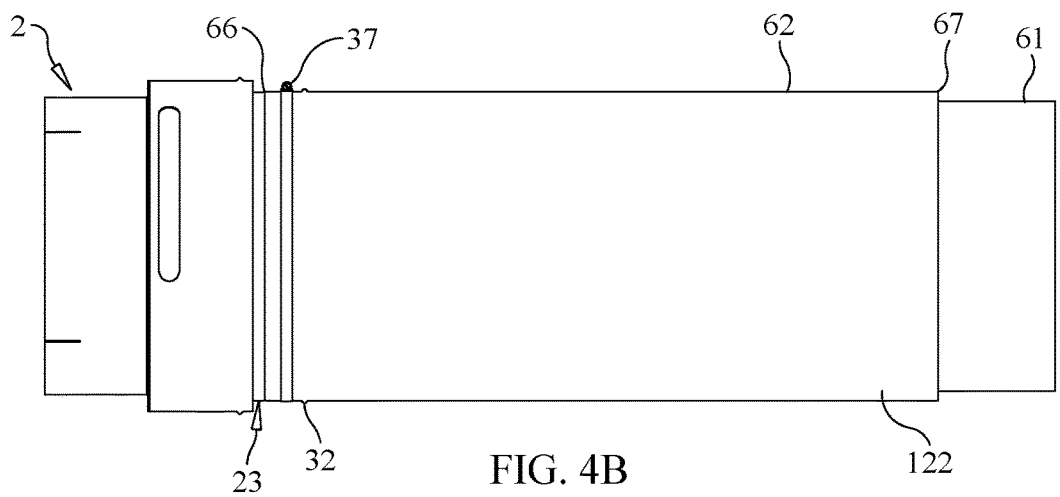
Figure 4C:
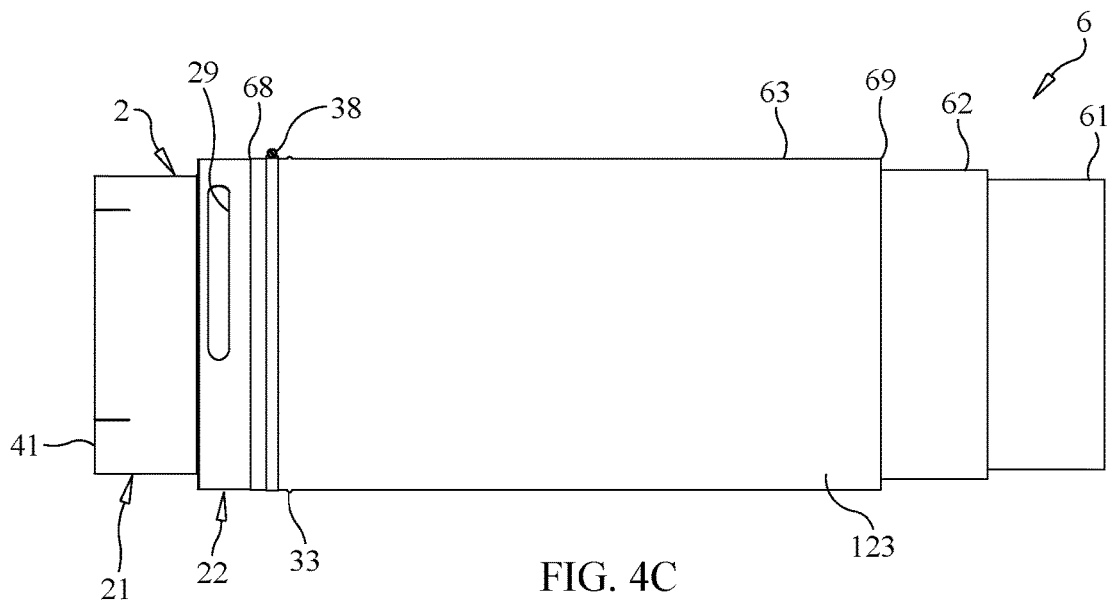
Figure 5A:
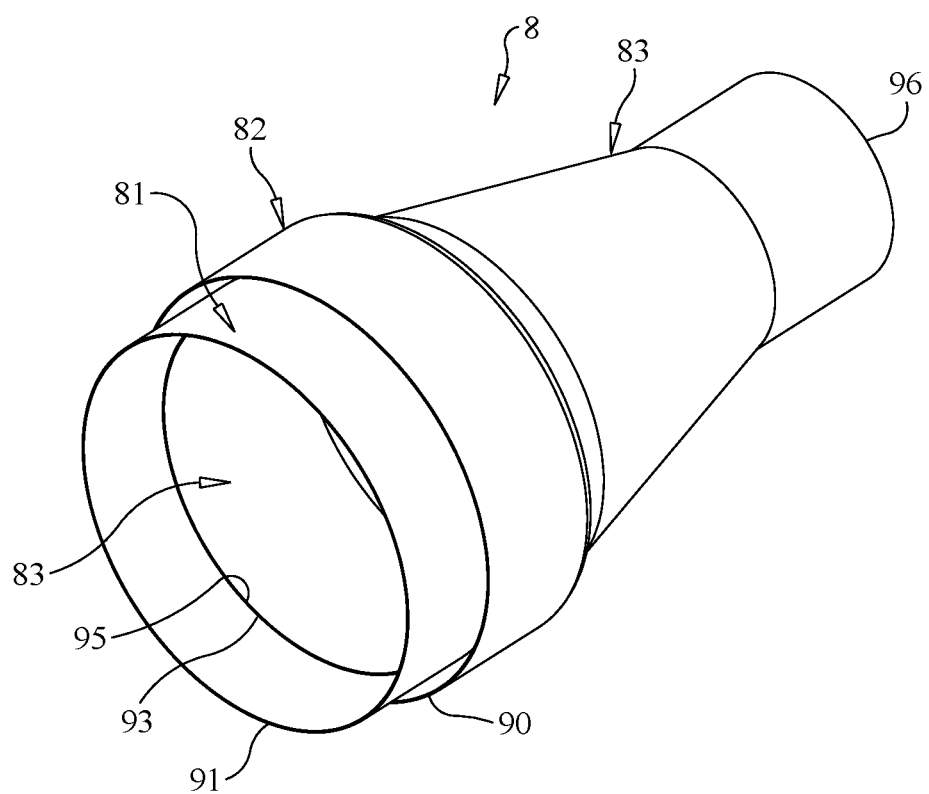
FIGS. 5A, 5B, & 5C are, respectively, perspective, perspective exploded, and side exploded, views of an embodiment of a return hose assembly of a delivery system.
Figure 5B:
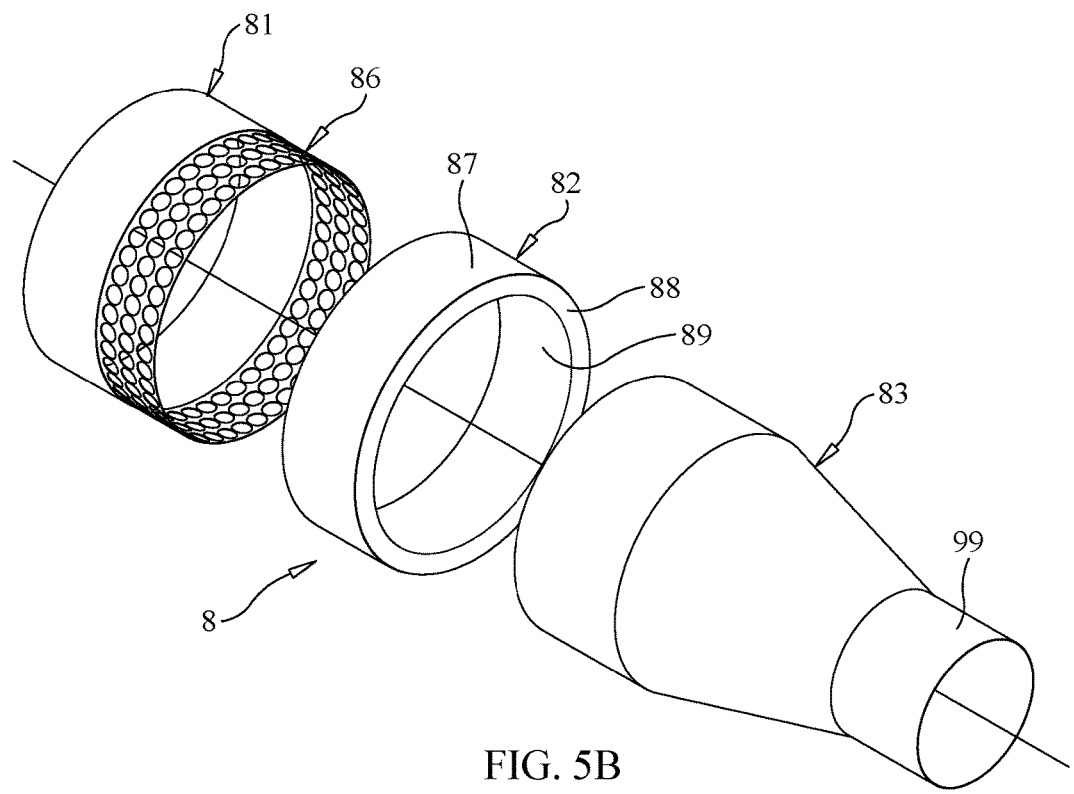
Figure 5C:
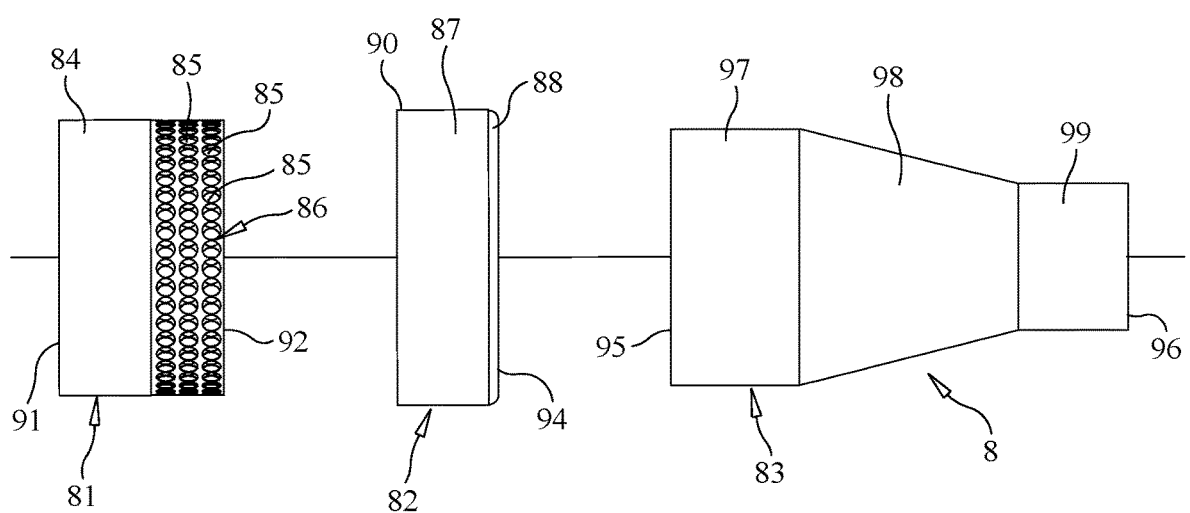
Figure 5D:
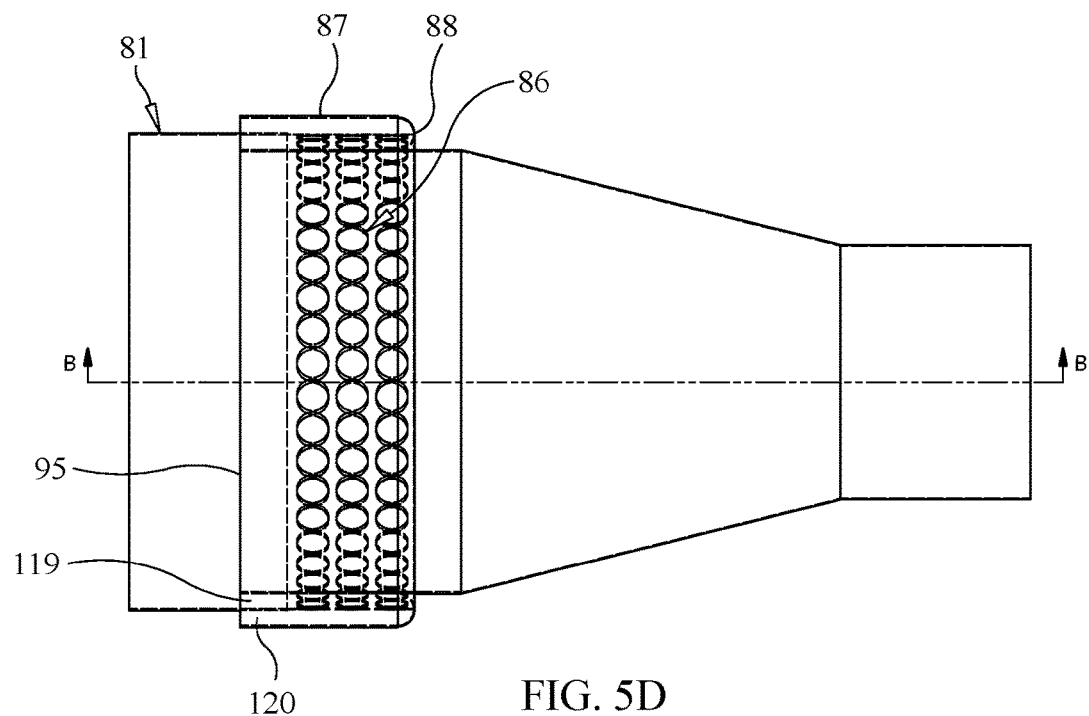
FIG. 5D is a side view of an embodiment of a return hose assembly of FIGS. 5A-5C.
Figure 5E:
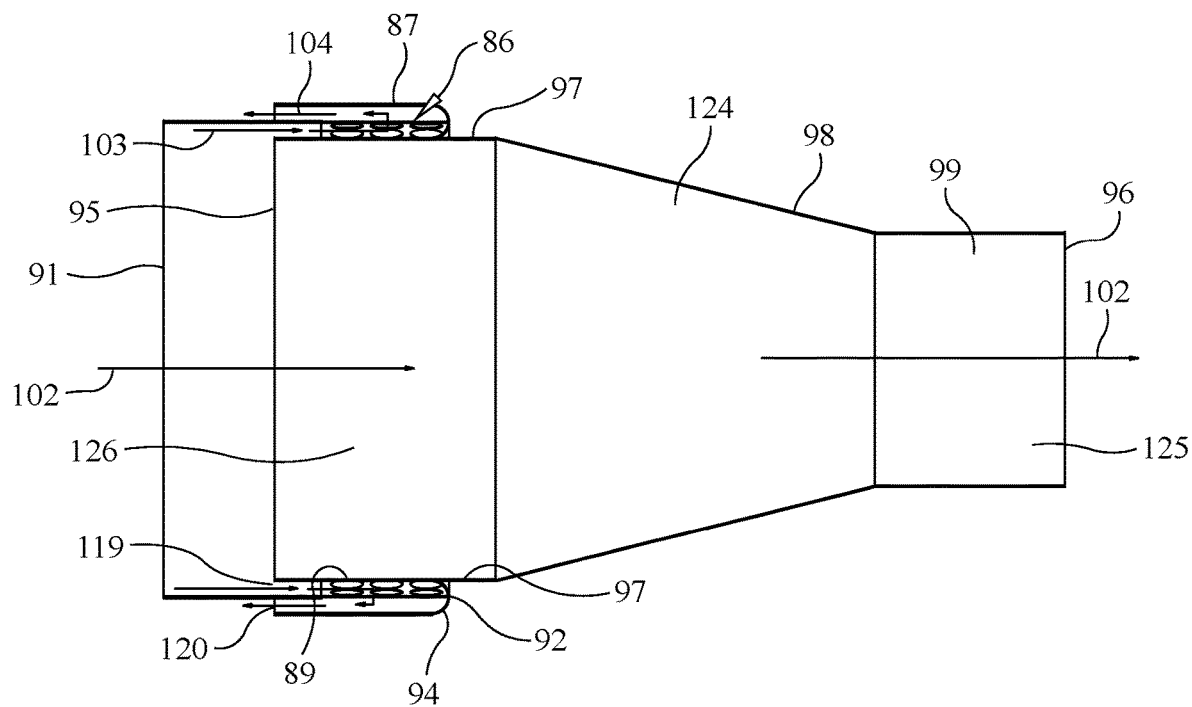
FIG. 5E is a cross-section view of the return hose assembly of FIG. 5D along section lines B-B.
Figure 5F:
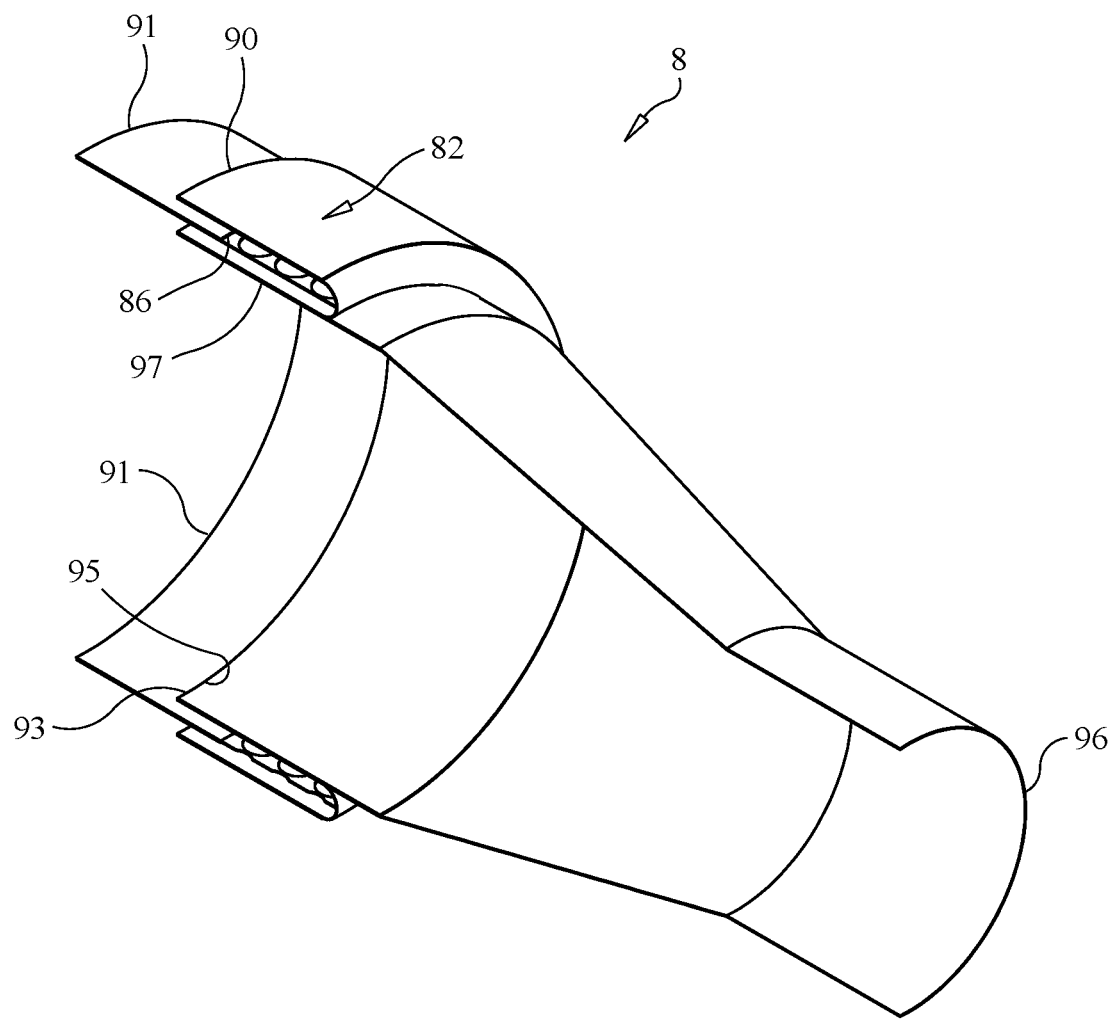
FIG. 5F is a perspective view of the cross-section of FIG. 5E.

Turning to FIGS. 4A-4C, an embodiment of counterflow hose assembly 6, shown attached in sequence to charge end assembly 2, includes supply hose 61 having inlet end 64 and outlet end 65, counterflow hose 62 having inlet end 66 and outlet end 67, and exterior hose 63 having inlet end 68 and outlet end 69. Hoses 61, 62, 63 are arranged concentrically to one another and are fixed at their inlet ends 64, 66, 68 to charge end assembly 2, and at their outlet ends 65, 67, 69 to return hose assembly 8. Inside of supply hose 61 is an inner flowpath, supply channel 121; the annular space between supply hose 61 and counterflow hose 62 is a middle flowpath, annular parallel flow channel 122, and the annular space between counterflow hose 62 and exterior hose 63 is an outer flowpath, annular counterflow channel 123. The outlet end lengths shown here (staggered, with supply hose longest) are for the convenience of depiction; the configuration in use is arranged so that the ends conform to return hose assembly 8 or return hose assembly 208 (as shown in FIGS. 6 and 9).

Turning to FIGS. 5A-5F, with reference to FIG. 6, an embodiment of return hose assembly 8 includes three tubular sections: flow divider section 81, reverser section 82, and supply discharge section 83. Each of sections 81-83 is made of a resilient material suitable for high airflows and vibration, varying temperatures, wear, and physical stress due to hose-induced tension and torsion. Such resilient materials include woven fabrics, canvas, nylons, non-woven fabrics, steels, sheetmetals, and other materials such as fiberglass.

Divider section 81 includes end 91 and return end 92, with divider 84 near end 92 and screen assembly 86, comprising holes 85, near end 92. Screen assembly 86 provides a rigid structure to support reverser section 82 while permitting air to pass through holes 85 from inner annular channel 119 to outer annular channel 120. Screen assembly 86 is formed of mesh at attached to divider 84 by sewing. And divider 84 supports hose retaining assembly 135 for attachment to counterflow hose 62. In practice, starter connection 26 may be a standard size, e.g. 12 inches or 14 inches.

Reverser section 82 is tubular but has a substantially U-shaped cross-section, and includes inner inlet end 93, outer outlet end 90, and reversing end 94, as well as reversing channel 88 at reversing end 94. It also has exterior wall 87 and interior wall 89 extending between reversing end 94 and, respectively, outer outlet end 90 and inner inlet end 93. The space between exterior wall 87 and interior wall 89 comprises an annular space closed at one end by reversing channel 88, forming inner annular channel 119 and outer annular channel 120 (as separated by divider section 81). Exterior wall 87 and interior wall 89 extend enough so that screen assembly 86 of divider section 81 is fully enclosed within. Exterior wall 87 supports hose retaining assembly 137 for attachment to exterior hose 63.

Supply discharge section 83 is tubular but of decreasing diameter, and includes intake end 95, discharge end 96, intake section 97 at intake end 95, discharge end section 99 at discharge end 96, and constriction section 98 between intake section 97 and discharge end section 99. Intake section 97 is a simple tube shape, and supports hose retaining assembly 133 on its interior for attachment to supply hose 61. Constriction section 98 is truncated conical in shape, smaller at the discharge end, and may be formed in known manners to create that shape. Discharge end section 99 is also a simple tube shape. Intake section 97, constriction section 98, and discharge end section 99 may each be connected to each other in manners appropriate for their materials, such by stitching (not shown). Intake section 97 forms intake plenum 126 therein, constriction section 98 forms constriction 124 therein, and discharge end section 99 forms discharge plenum 125 therein.

With further reference to FIGS. 5 & 6, reverser section 82 is connected at interior wall 89 to supply discharge section 83 at the exterior of intake section 97. Connection may be made in a manner appropriate for their materials, such as hose retaining assemblies 133, 135, 137 therebetween, or by stitching (not shown). Flow divider section 81 is connected to reverser section 82 between reversing end 94 and return end 92 by stitching (not shown).

Turning to FIGS. 8A-8F, with reference to FIG. 9, an embodiment of return hose assembly 208 includes three tubular sections: reverser section 281, flow divider section 282, and supply discharge section 283. Each of sections 281-283 is made of a resilient material suitable for high airflows and vibration, varying temperatures, wear, and physical stress due to hose-induced tension and torsion. Such resilient materials include canvas, nylons, steels, sheetmetals, and other materials such as fiberglass. The various sections of each may be connected to each other in manners appropriate for their materials, such by stitching (not shown). In an embodiment, sections 281-283 are made of high-performance woven fabrics and are joined by stitching.

Reverser section 281 is tubular but of decreasing diameter, and includes return end 291 and sealed end 292, and includes exterior wall 284 near return end 291 and tapered closure 288 near sealed end 292. Return end 291 is a simple tube shape. Tapered closure 288 is truncated conical in shape, smaller at the sealed end, and may be formed in known manners to create that shape. Exterior wall 284 supports hose retaining assembly 137 for attachment to exterior hose 63.

Flow divider section 282 is tubular but of decreasing diameter, and includes inner inlet end 293, sealed end 294, and includes divider 287 near end 293, tapered closure 290 near end 294, and screen assembly 286, comprising holes 285 between divider 287 and tapered closure 290. Divider 287 is a simple tube shape and supports hose retaining assembly 135 for attachment to counterflow hose 62. Tapered closure 290 is truncated conical in shape, smaller at the sealed end, and may be formed in known manners to create that shape. Screen assembly 286 is formed of mesh attached to divider 287 and tapered closure 290 by sewing.

Supply discharge section 283 is tubular but of decreasing diameter, and includes intake end 295, discharge end 296, intake section 297 at intake end 295, discharge end section 299 at discharge end 296, and constriction section 298 between intake section 297 and discharge end section 299. Intake section 297 is a simple tube shape, and supports hose retaining assembly 133 on its interior for attachment to supply hose 61. Discharge end section 299 is a simple tube shape. Constriction section 298 is truncated conical in shape, smaller at the discharge end, and may be formed in known manners to create that shape.

Tapered closure 288 and tapered closure 290 are each joined to constriction section 298 at their respective sealed end 292 of reverser section 281 and sealed end 294 of divider section 282. That joining acts to close off that end of the section and may be direct or indirect, in that one of sealed end 292 and sealed end 294 may be directly joined to constriction 298 and the other joined to the first, or both sealed end 292 and sealed end 294 may be directly joined to constriction 298 at the different points or at the same point. In this embodiment, they are shown as the latter. Connection may be made in a manner appropriate for their materials, such stitching or different attachment structures for tubular connections, including hook-and-loop connectors or zippers.

Intake section 297 forms intake plenum 126 therein, constriction section 298 forms constriction 124 therein, and discharge end section 299 forms discharge plenum 125 therein.

The space between exterior wall 284 and tapered closure 290 (on the outer side) and intake section 297 and constriction 298 (on the inner side) comprises an annular space closed at one end by the joining (direct or indirect) of tapered closure 290 to constriction 298, and forming inner annular channel 119 and outer annular channel 120 (as separated by divider section 82). Exterior wall 284 and tapered closure 290 extend enough so that screen assembly 286 of divider section 282 is fully enclosed within. Screen assembly 286 permits air to pass through holes 285 from inner annular channel 119 to outer annular channel 120.

With further reference to FIG. 9, reverser section 281 is connected at tapered closure 288 near sealed end 292 to flow divider section 282 at tapered closure 290 near sealed end 294. Further, both reverser section 281 and flow divider section 282 are connected near sealed ends 292, 294 to constriction section 298 of supply discharge section 283. In an embodiment, flow divider section 282, reverser section 281, and supply discharge section 283 are connected by stitching (not shown).

Figure 7A:
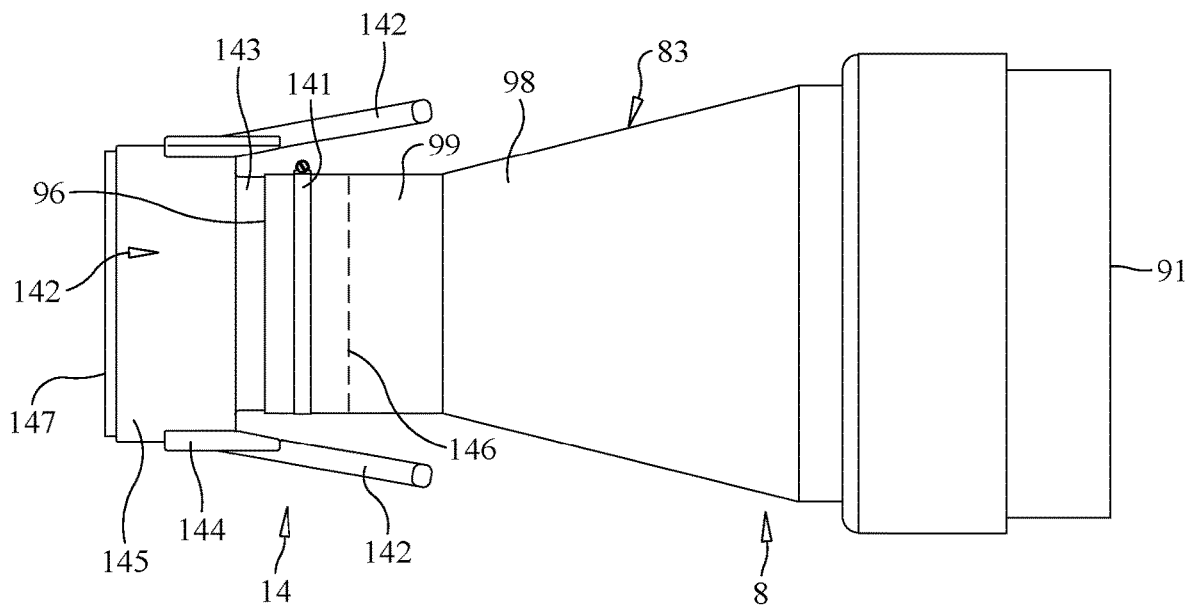
FIGS. 7A & 7B are, respectively, side and perspective views of an embodiment of a return hose assembly connected to a connector assembly.
Figure 7B:
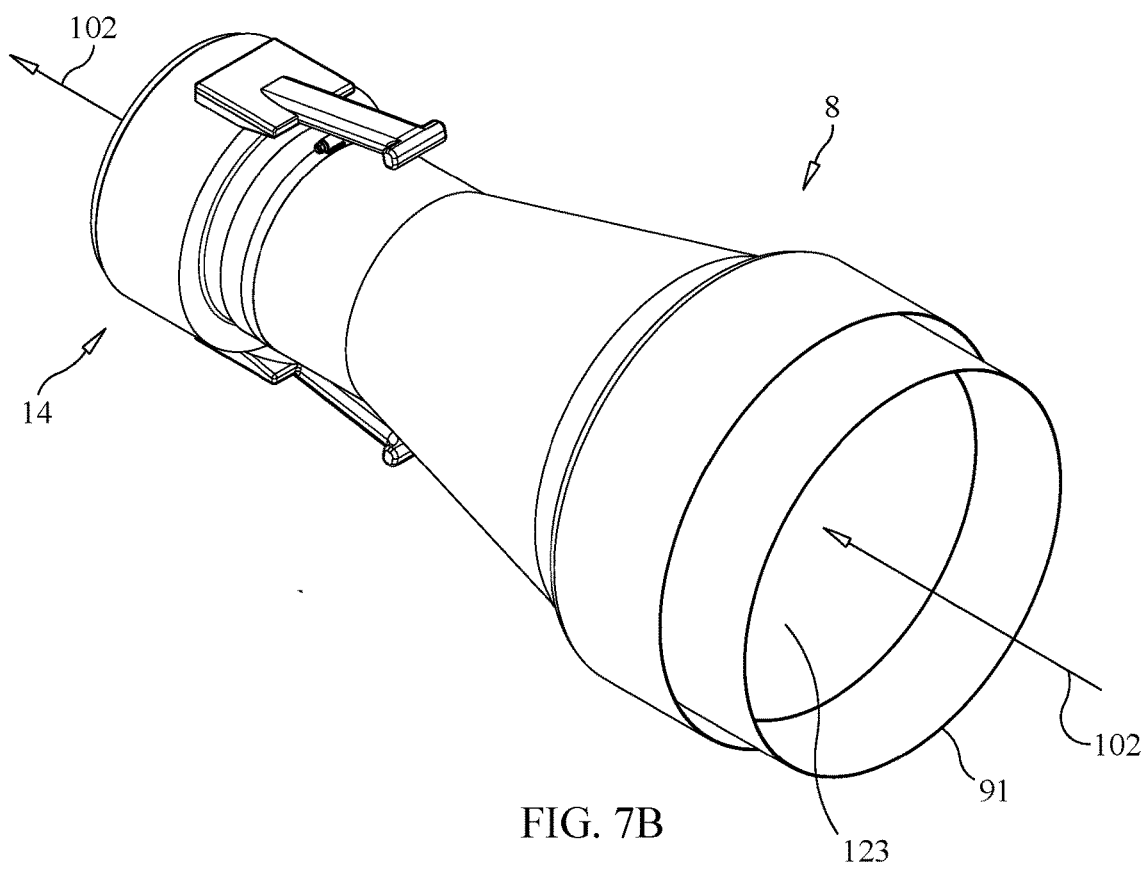

Turning to FIGS. 7A-7B, an embodiment of air delivery system 10 includes a connection between return hose assembly 8 and connector assembly 14. Connector assembly 14 include inlet end 146, outlet end 147, inlet tube 143 at inlet end 146, and connector body 142 connected to inlet tube 143. Discharge end section 99 of return hose assembly 8 is fitted over inlet end 146 of inlet tube 143 and secured using band clamp 141. Connector 145 is at outlet end 147 of connector body 142, and is operated by opening and closing levers 142 to act upon links 144 on connector body 142.

In operation, conditioned air 101 supplied by air supply unit 15 flows into inlet plenum 110. Moving downstream, some of airflow 101 is diverted by flow diverters 35 into insulation intakes 112; and thence into annular channel 113 as a parallel insulating flow 103.

The airflow not diverted by diverters 35 passes into supply plenum 115 as supply flow 102. Supply flow 102 leaves supply plenum and then passes into supply channel 121 in supply hose 61, then into intake plenum 126 of intake section 97, to discharge plenum 125, and then into and out of connector assembly 14, and then into aircraft 10. Supply flow 102 is conditioned air whose temperature and other characteristics are desired to be controlled, and which is the airflow to be insulated.

Parallel insulating flow 103, past insulation intakes 112 flows in annular channel 113, then into annular parallel flow channel 122 between supply hose 61 and counterflow hose 62, then into inner annular channel 119, through holes 85 of screen assembly 86.

Flow past holes 85 into outer annular channel 120 becomes insulating counterflow 104, which flows in the opposite direction of parallel insulating airflow 103. That flow begins in outer annular channel 120, then to annular counterflow channel 123 between counterflow hose 62 and exterior hose 63, then to annular channel 117, and finally becomes discharge airflow 105 as it exits via counterflow discharge slots 29 (or via counterflow discharge slots 29 past one or more dampers 30).

Volume of the parallel insulating flow 103 and insulating counterflow 104, and its insulating effect, is influenced by many variables, including the PCA and ambient air temperatures, overall airflow, hose sizing-derived ratios ($R_{ia}$, $R_{ca}$, $R_{pa}$, and $R_{cp}$), shape/configuration of diverters 35, and resistance to flow. Resistance to flow can be increased or decreased (having the inverse effect or flow rate and volume) by closing or opening dampers 30. Closing dampers 30 increases the resistance, dropping the overall volume of air forming parallel insulating flow 103 and insulating counterflow 104, which can thus both expect to absorb (or shed) more heat from (or to) the environment during that flow. Reducing the temperature gradient across the system may improve the overall efficiency of the system if other factors provide sufficient cooling/heating. Opening dampers 30 reduces the resistance, increasing the overall volume of air forming parallel insulating flow 103 and insulating counterflow 104, which can thus both expect to absorb (or shed) less heat from (or to) the environment during that flow. Increasing the temperature gradient across the system may improve the cooling/heating effect of the system.

Airflow in the insulating middle layer will receive heat from, or shed heat to, the outer counterflow layer (depending on ambient conditions) as it travels downstream. In turn, airflow in the middle insulating layer will shed head to, or receive heat from, the inner path. That insulating layer is in parallel flow with, and closest in temperature to, the airflow in the inner path, which is conditioned for delivery to the aircraft, because it comes from either a common source or has likewise been conditioned. The airflow temperatures in the inner path and the middle insulating layer may be identical, or very nearly identical at the start of the insulating layer. Due to heat shed to or received from the inner path, the temperature of the middle insulating layer will diverge from the temperature of the inner path as the airflow travels the length of the middle insulating layer. This can be expressed as the absolute value of the temperature difference between the airflow in the insulating layer and the airflow in the inner path at the end point being greater than the absolute value of the temperature difference between the airflow in the insulating layer and the airflow in the inner path at the starting point. Expressed differently, the endpoint absolute value less the starting point absolute value is greater than zero. In this case, the system is insulating the airflow in the inner path. That relative proximity of temperature reduces the temperature gradient between the two, serving to reduce heat transfer therethrough. Were the initial airflow temperature in the middle insulating layer to be below that at the start of the airflow in the inner path (e.g. for use in hot ambient conditions), this greater-than-zero relationship might hold true for only part of the length of the airflow, that is, until the airflow temperature in the middle insulating layer became hotter than that of the airflow in the inner path.

In an embodiment, supplying airflow includes comprising delivering supply airflow to a first point along a supply hose at a first supply temperature, and delivering the supply airflow to a downstream end of the supply hose at a second supply temperature and providing parallel insulating airflow to a first point along a parallel insulating airpath at a first parallel insulating temperature, and delivering the parallel insulating airflow to a downstream end of the first parallel insulating airpath at a second parallel insulating temperature. In this instance, the first point along the parallel insulating airpath is located radially outward of the first point along the supply hose, and the first supply temperature and said first parallel insulating temperature differ by an amount $T_1$ and said second supply temperature and said second parallel insulating temperature differ by an amount $T_2$ and the absolute value of $T_2$ is greater than the absolute value of $T_1$. In an embodiment, that first point along the supply hose is located at an upstream end of the supply hose and the first point along the parallel insulating airpath is located at an upstream end of the parallel insulating airpath. Also in an embodiment, $T_1$ is approximately zero, meaning the first temperatures are approximately the same.

Airflow in the outer counterflow layer will receive heat from, or shed heat to, the environment (depending on ambient conditions, such as convective, conductive, or solar loads) as it travels in the upstream direction. In turn, airflow in the outer counterflow layer will shed heat to, or receive heat from, the insulating layer. That counterflow is in the opposite direction to the insulating flow, and will initially be close in temperature to the middle insulating layer (as it was the same flow prior to reversal). The temperatures will then diverge due to environmental loading as the counterflow layer travels in an upstream direction. The initial relative proximity of temperature reduces the temperature gradient between the two, serving to reduce heat transfer therethrough, while creating the greatest gradient nearest the source of the conditioned air.

In operation, an air supply unit supplies conditioned air to the PCA air delivery system at a starter section. The starter section receives the conditioned air in an inlet plenum. Part of that conditioned air is bled off by flow diverters in the starter section to form a parallel insulating flow. The airflow not bled off is delivered as a supply flow in supply channel in a supply hose for delivery into an intake section at the downstream end of the supply hose, and via discharge plenum, and delivery to an aircraft via a connector assembly.

The airflow provided as a parallel insulating flow is delivered via insulation intakes into a parallel flow annular channel concentrically outward of the main supply channel. That parallel flow annular channel is located between the supply hose and the concentrically outward counterflow hose. It then passes, at the end of supply hose and the counterflow hose into reverser section.

The reverser section provides an insulating counterflow, which flows in the opposite direction of the parallel insulating airflow and the supply airflow. Reverser section redirects the parallel insulating flow to become a counterflow insulating flow (moving upstream relative to the supply flow). That flow is provided to an annular counterflow channel between the counterflow hose and an exterior hose, and thence back to the starter section. That counterflow insulating airflow then is discharged as discharge airflow as it exits the starter section via counterflow discharge slots (possibly via dampers). In another embodiment, the counterflow insulating airflow, which may still be cooler than ambient air (if supply air is being cooled, or hotter if supply air is being heated) is redirected to the PCA unit supplemental intake air. This reduces the overall conditioning load for the PCA unit, as that fraction of intake air is closer to the desired conditioned temperature.

The insulating counterflow insulates the parallel insulating flow from ambient heat loss/gain, and its temperature diverges from the parallel insulating flow as the latter flows downstream and the former flows upstream. The parallel insulating flow also insulates the supply flow, indirectly, from ambient heat loss/gain, and its temperature diverges from the supply flow temperature as both flow downstream. Even though both may rise (or fall), the supply flow temperature remains closer to its starting temperature.

Figure 1B:
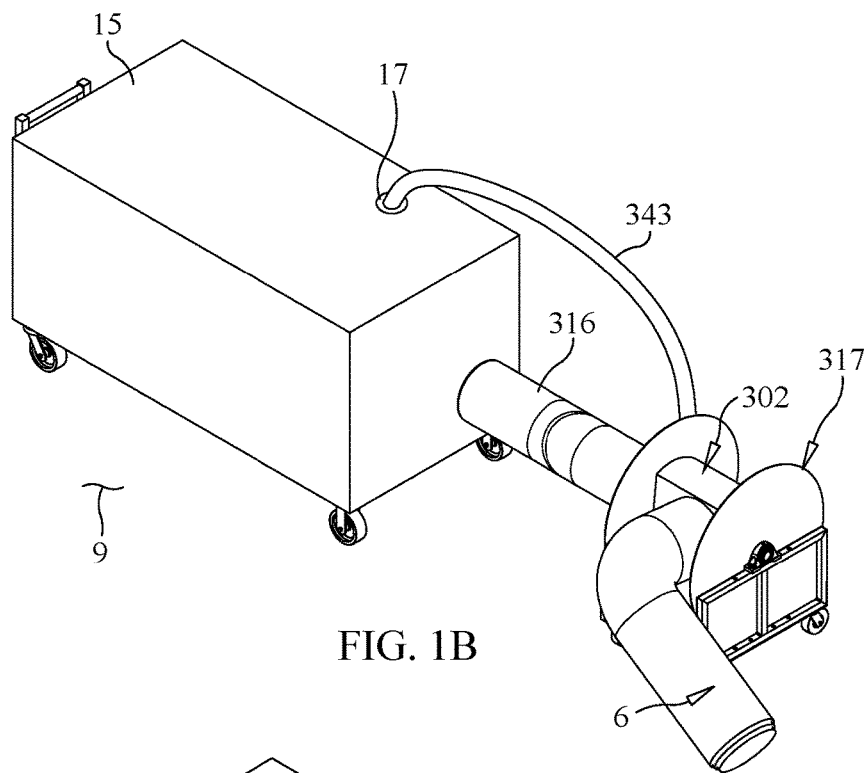
FIGS. 1B & 1C are perspective views of embodiments of a reel system in use with an embodiment of a charge end assembly of a delivery system.
Figure 1C:
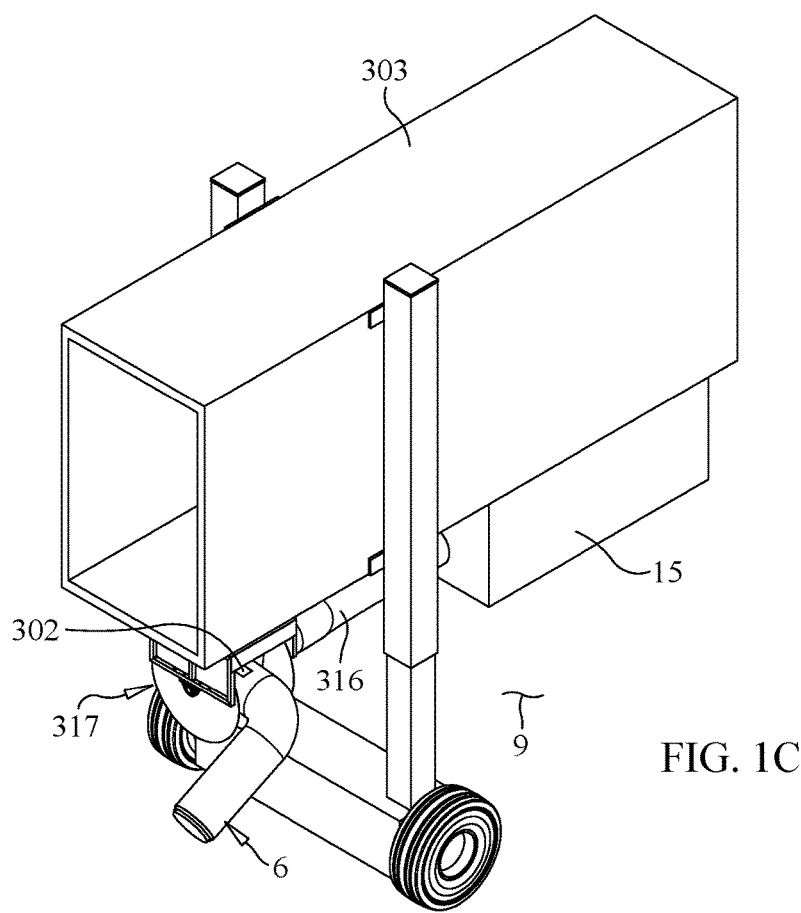

FIGS. 1B and 1C, and FIGS. 10A-10C, show an embodiment of the counterflow air delivery system in which an additional element is added. In FIG. 1B, mobile conditioned air supply unit 15 sits on tarmac 9 as separate cart. In FIG. 1C, conditioned air supply unit 15 is supported off tarmac 9 by jetbridge 303. In each case, the system includes output starter hose 316 for delivering conditioned air for aircraft 10. Output starter hose 316 is connected to a starter body or starter section, i.e. the charge end assembly 302, which connects to hose assembly 6. Output starter hose 316 connects air supply 15 to hose reel assembly 317. Charge end assembly 302 is supported by hose reel assembly 317 and receives conditioned air therefrom. Hose assembly 6 (only a short piece of which is shown here) can be reeled up on hose reel assembly 317 when not in use, and unreeled to be deployed. In an alternative embodiment (not shown), charge end assembly 302 is supported by a cart or supported by jetbridge 303 with a basket for holding hose assembly 6. In another embodiment, counterflow intake hose 343 connects the exhaust on charge end assembly 302 to supplemental air intake 17 on conditioned air supply unit 15 to direct counterflow air to form intake air for conditioned air supply unit 15.

Figure 10A:
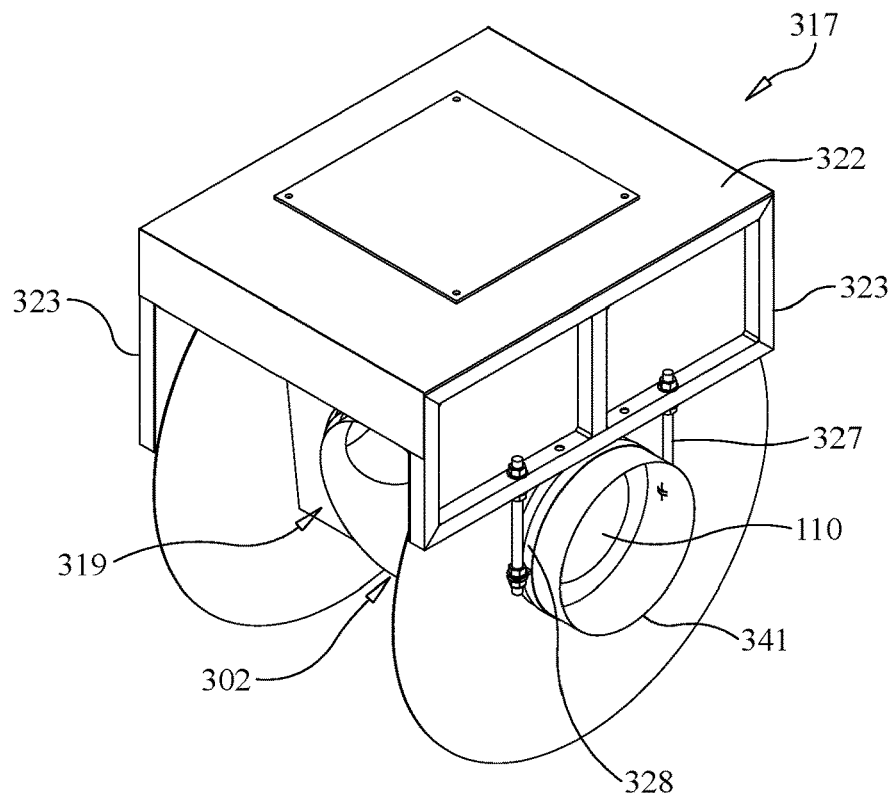
FIGS. 10A, 10B, are, respectively, perspective and front views of an embodiment of a reel system for use with an embodiment of a charge end assembly of a delivery system.
Figure 10B:
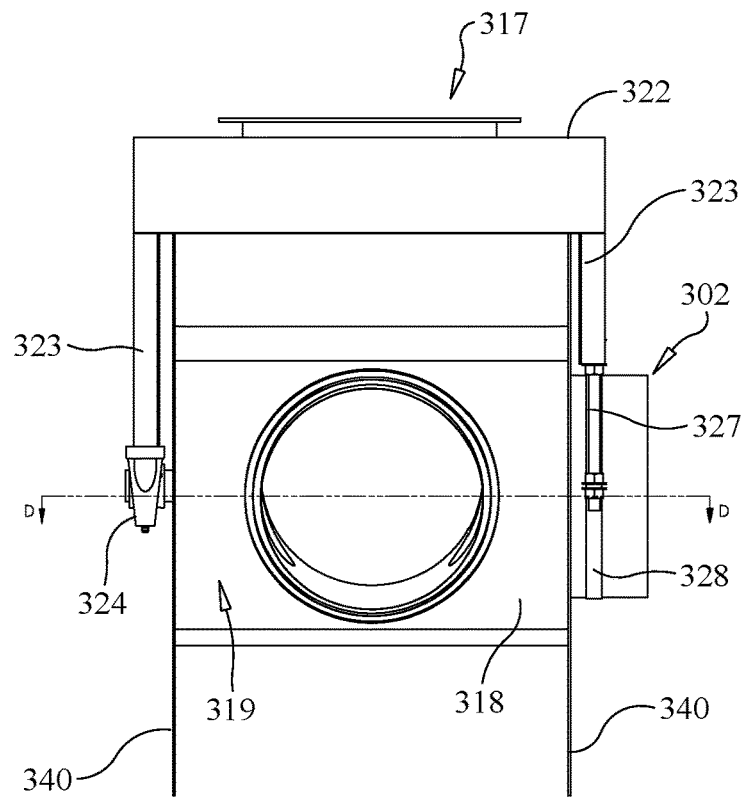
Figure 10C:
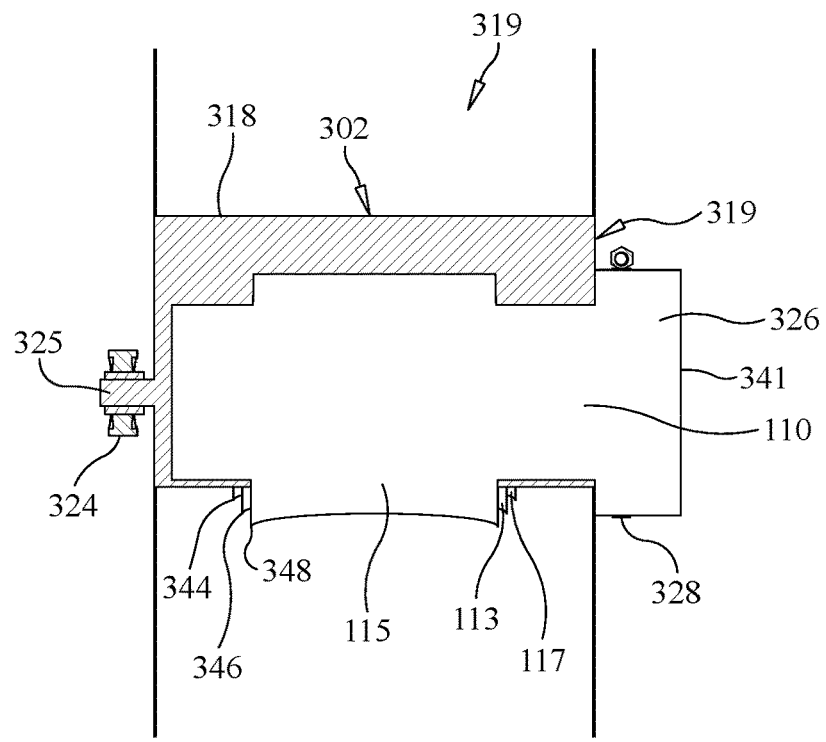
FIG. 10C is a cross-section view of the reel portion of the reel system of FIGS. 10A-10B, along section lines D-D.
Figure 11A:
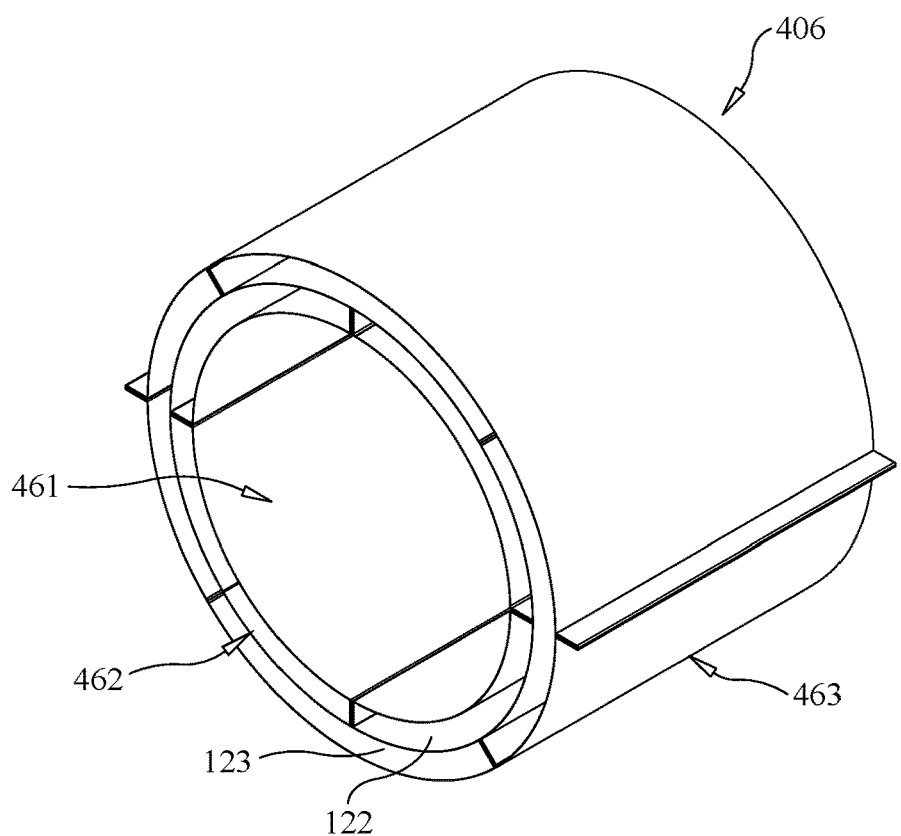

Turning to FIGS. 10A-10C, hose reel assembly 317 includes spindle assembly 319, around which hose assembly 6 can be wound, and mount 322. Spindle assembly 317 includes spindle body 318, reel sides 340, and charge end assembly 302. Charge end assembly 302 is structurally and functionally nearly identical to charge end assembly 2, except that it accepts air via starter connection 326 with inlet end 341. Starter connection 326 from charge end assembly 302 along the rotational axis at one end of spindle assembly 319, rather than in-line with the outlet air. Charge end assembly 302 includes tubular connectors 22, 23, and 24 (show in FIGS. 3A-3F), which include, respectively from the outermost inward, discharge ends 344, 346, 348. Spindle body 318 supports charge end assembly 302, and connects it to reel sides 340 on either end thereof. Spindle body 318 forms the center about which hose assembly 6 may be wound, with reel sides 340 holding the hose assembly 6 thereon. Spindle body 318 include axle 325 extending along the rotational axis end of spindle assembly 319 at the opposite side from inlet end 341.

That conditioned air from air supply unit 15 passes into inlet plenum 110, and passes into supply plenum 115, parallel insulating air flows into annular channel 113, and returning counterflow air flows into annular channel 117. As described in detail in connection with FIGS. 3A-3F, charge end assembly 302 creates supply flow 102 and parallel insulating flow 103, and receives insulating counterflow 104 to create discharge airflow 105 (shown in FIG. 3E) on the outside of spindle body 318. Mount 322 includes side arms 323 and 326 to support spindle assembly 319 and permit it to rotate about its axis. One arm 323 extends down toward axle 325 and supports bearing 324 in which axle 325 may rotate. A crank or motor (not shown) may be attached to axle 325 to facilitate re-winding hose assembly 6. The opposing arm 323 extends down toward starter connection 326, and supports clamp assembly 327. Clamp assembly 327 includes band clamp 328 for encircling and supporting starter connection 326. Band clamp 328, if not tight, will permit starter connection 326 to rotate. In another embodiment (not shown), a bearing race is provided for rotatably supporting starter connection 326.

Turning to FIGS. 11A-11D, in another embodiment, reinforced counterflow hose assembly 406 includes, from the outermost inward, exterior hose 463, counterflow hose 462, and supply hose 461. In these figures, hose assembly 406 is depicted only in a short section to illustrate the supporting and reinforcing structures therein. Exterior hose 463, counterflow hose 462, and supply hose 461 include a number of tabs which extend radially outward therefrom. Supply hose 461 includes tabs 415-418 spaced approximately at 90-degree intervals around supply hose 461. Counterflow hose 462 includes tabs 425-438 spaced approximately at 90-degree intervals around counterflow hose 462. Exterior hose 463 includes tabs 435-436 spaced approximately at 180-degree intervals around exterior hose 463.

Tabs 415-418 are formed by joined edges of supply tube sections 411-414 at their respective inner faces (rather than joined overlapping edges inner to outer faces). Tabs 425-428, and 435-436, are likewise formed by edges, respectively, of counterflow tube sections 421-424, and exterior tube sections 431-432. FIG. 11D shows detail (typical) for tab 415. Tab 415 is formed by joining edges 444 of supply tube sections 411 and 412 with inner faces 441 butted together and joined by wide seam 443. Tab 415 has as its exterior outer face 442 of supply tube sections 411 and 412. Under tension (i.e, internal air pressure), supply tube sections 411-414 assume a circular configuration, forming supply hose 461. This causes tabs 415-418 to assume an outwardly radial orientation. In like fashion, counterflow hose 462 and exterior hose 463 and their respective tabs 425-428 & 435-436 are formed of counterflow tube sections 421-424 and exterior tube sections 431-432. Tabs 415-418, 425-428, and 435-436 may also be formed directly on supply hose 461, or by another method leaving an extending edge standing up radially. Other numbers of tabs and corresponding panels are possible (not shown), such as 3, 5, or 6, or non-symmetrical spacing, such as forming extra tabs along one face (down) of exterior hose 463. In addition, other configurations are possible (not shown), such as forming the tabs on the interior of one or more of the hoses.

In use, tabs 415-418 extend outwardly into annular parallel flow channel 122 and support counterflow hose 462, and tabs 425-428 extend outwardly into annular counterflow channel 123 and support exterior hose 463. In practice, this helps to maintain their shape and to reduce or prevent collapsing annular parallel flow channel 122 and annular counterflow channel 123 when hose assembly 406 is bent.

The invention claimed is:

1. An insulating preconditioned air delivery system, for connecting to a PCA airflow from a PCA unit flowing in a downstream direction, comprising:
a supply hose to carry a supply airflow;
an annular parallel flow channel to carry a parallel insulating airflow;
said annular parallel flow channel concentrically surrounding the supply hose;
an annular counterflow channel to carry an insulating counterflow in an upstream direction;
said annular counterflow channel concentrically surrounding the annular parallel flow channel; and
a counterflow intake hose to fluidically connect the annular counterflow channel to a supplemental air intake on the PCA unit.

2. The air delivery system of claim 1, further comprising:
a bleed air structure fluidically connecting said supply hose to said annular parallel flow channel.

3. The air delivery system of claim 1, further comprising:
one or more flow diverters.

4. The air delivery system of claim 1, further comprising:
a reverser body;
said reverser body fluidically connecting the annular parallel flow channel to the annular counterflow channel.

5. The air delivery system of claim 4, further comprising:
said reverser body further comprising a set of three concentrically arranged tubular structures, said tubular structures comprising;
a supply tube, said supply tube fluidically connected to the supply hose;
a divider, outward of said supply tube; and
an exterior wall, outward of said divider.

6. The air delivery system of claim 1, further comprising:
a reverser body and a counterflow hose assembly;
said counterflow hose assembly comprising a set of three concentrically arranged hoses of decreasing diameter; and
the counterflow hose assembly comprising one or more PCA hose connection mechanisms; and
said reverser body comprising a closure;
said reverser body fluidically connected to the supply hose; and
said closure fluidically connecting the annular parallel flow channel to the annular counterflow channel.

7. The air delivery system of claim 1, further comprising:
a charge end assembly connected to the supply hose; and
the counterflow intake hose connected to said charge end assembly.

8. The air delivery system of claim 1, further comprising:
a hose assembly;
said hose assembly comprising a set of three concentrically arranged hoses of decreasing diameter.

9. The air delivery system of claim 8, further comprising:
one or more of said concentrically arranged hoses comprising an extending edge standing radially outward therefrom.

10. A method of providing a flow of insulated preconditioned air for use in an environment having a PCA airflow flowing in a downstream direction, comprising:
providing a supply airflow derived from the PCA airflow to a supply hose;
providing a parallel insulating airflow to an annular parallel flow channel concentrically surrounding the supply hose; and
delivering an insulating counterflow in an upstream direction to an annular counterflow channel concentrically surrounding the annular parallel flow channel; and
redirecting the insulating counterflow to a PCA unit as supplemental intake air.

11. The method of claim 10, the providing a parallel insulating airflow step further comprising:
directing the PCA airflow past flow diverters extending into the PCA airflow.

12. The method of claim 10, further comprising:
the providing the supply airflow step further comprising providing the supply airflow from the starter body to the supply hose.

13. The method of claim 10, the delivering step further comprising:
reversing the direction of the parallel insulating airflow to upstream; and
fluidically connecting the parallel insulating airflow in the annular parallel flow channel to the annular counterflow channel.

14. The method of claim 13, the reversing step further comprising:

delivering the parallel insulating airflow to a reverser body;
the reverser body further comprising a set of three concentrically arranged tubular structures.

15. The method of claim 13, said fluidically connecting step comprising:
operating a hose retaining assembly.

16. The method of claim 13, further comprising:
said providing the parallel insulating airflow comprising creating bleed air from the PCA airflow and directing that bleed air into the annular parallel flow channel.

* * * * *